United States Patent
Keren et al.

(10) Patent No.: US 8,259,788 B2
(45) Date of Patent: Sep. 4, 2012

(54) MULTIMEDIA STREAM COMPRESSION

(75) Inventors: Avishai Keren, Rosh Ha'Ayin (IL); Meir Feder, Herzelia (IL); Ofir Paz, Rishon Lezion (IL)

(73) Assignee: Microsoft Corporation, Redmond, WA (US)

( * ) Notice: Subject to any disclaimer, the term of this patent is extended or adjusted under 35 U.S.C. 154(b) by 3089 days.

(21) Appl. No.: 09/770,767

(22) Filed: Jan. 25, 2001

(65) Prior Publication Data

US 2001/0026591 A1    Oct. 4, 2001

(51) Int. Cl.
- H04N 7/12   (2006.01)
- H04N 11/02  (2006.01)
- H04N 11/04  (2006.01)
- H04B 1/66   (2006.01)

(52) U.S. Cl. .................................. 375/240.01

(58) Field of Classification Search .......... 375/240.01–240.03, 240.12–240.16, 375/240.23–240.24, 240.26; 725/86–87, 725/91, 95, 100, 105, 110, 114; 348/384.1, 348/390.1, 420.1
See application file for complete search history.

(56) References Cited

U.S. PATENT DOCUMENTS

| | | | | |
|---|---|---|---|---|
| 4,729,020 | A | 3/1988 | Schaphorst et al. | 375/340.05 |
| 4,963,030 | A | 10/1990 | Makur | 358/133 |
| 5,115,309 | A | 5/1992 | Hang | 358/133 |
| 5,229,862 | A | 7/1993 | Takahashi et al. | 386/109 |
| 5,305,195 | A | 4/1994 | Murphy | 705/1 |
| 5,319,455 | A | 6/1994 | Hoarty et al. | 348/7 |
| 5,493,638 | A | 2/1996 | Hooper et al. | 395/135 |
| 5,564,001 | A | 10/1996 | Lewis | 395/154 |
| 5,583,995 | A | 12/1996 | Gardner et al. | 709/219 |
| 5,612,742 | A | 3/1997 | Krause et al. | 348/385 |
| 5,617,333 | A | 4/1997 | Oyamada et al. | 709/247 |
| 5,619,591 | A | 4/1997 | Tsang et al. | 382/166 |
| 5,623,587 | A * | 4/1997 | Bulman | 345/630 |
| 5,687,257 | A | 11/1997 | Paik et al. | 382/239 |
| 5,724,091 | A | 3/1998 | Freeman et al. | 348/13 |
| 5,734,853 | A | 3/1998 | Hendricks et al. | 395/352 |
| 5,761,606 | A | 6/1998 | Wolzien | 455/6.2 |
| 5,778,098 | A | 7/1998 | Lee et al. | 382/236 |
| 5,801,779 | A | 9/1998 | Uz et al. | 375/240.24 |
| 5,815,146 | A | 9/1998 | Youden et al. | 345/720 |
| 5,819,004 | A | 10/1998 | Azadegan et al. | 386/112 |
| 5,822,524 | A | 10/1998 | Chen et al. | 395/200.33 |
| 5,828,370 | A | 10/1998 | Moeller et al. | 345/720 |

(Continued)

FOREIGN PATENT DOCUMENTS

WO    WO97/12486    4/1997

(Continued)

OTHER PUBLICATIONS

Tristan Richardson, et al., *Virtual Network Computing*, IEEE Internet Computing, Jan.-Feb. 1998, pp. 33-38.

(Continued)

*Primary Examiner* — Nhon Diep

(57) ABSTRACT

A computer may be remotely accessed. At a first location, display commands are generated. The display commands are covered into a compressed video data stream. Each display element (5) is checked if it is encoded (52). If object is encoded, it is transcribed into MPEG (54). The image is adjusted for display (56) and compression (58). Additional steps of motion determination (60), change detection (62), compression depth and frame determination (66, 68) are executed. Then the data is transmitted to a second location. The display commands are decompressed and displayed as an image at the second location.

6 Claims, 4 Drawing Sheets

U.S. PATENT DOCUMENTS

| | | | |
|---|---|---|---|
| 5,835,843 A | 11/1998 | Haddad | 455/4.2 |
| 5,838,927 A | 11/1998 | Gillon et al. | 395/200.77 |
| 5,892,535 A | 4/1999 | Allen et al. | 348/9 |
| 5,926,569 A | 7/1999 | Nickerson | 382/232 |
| 5,961,603 A | 10/1999 | Kunkel et al. | 709/229 |
| 5,982,445 A | 11/1999 | Eyer et al. | 348/461 |
| 5,990,976 A | 11/1999 | Higashida | 648/588 |
| 6,003,030 A | 12/1999 | Kenner et al. | 707/10 |
| 6,005,620 A | 12/1999 | Yang et al. | 348/385 |
| 6,006,241 A | 12/1999 | Purnaveja et al. | 715/512 |
| 6,011,590 A | 1/2000 | Saukkonen | 375/240.05 |
| 6,014,693 A | 1/2000 | Ito et al. | 709/219 |
| 6,021,198 A | 2/2000 | Anigbogu et al. | 380/269 |
| 6,021,433 A | 2/2000 | Payne et al. | 709/219 |
| 6,044,396 A | 3/2000 | Adams | 725/95 |
| 6,049,316 A | 4/2000 | Nolan et al. | 345/698 |
| 6,049,831 A | 4/2000 | Gardell et al. | 709/236 |
| 6,108,727 A | 8/2000 | Boals et al. | 710/68 |
| 6,151,636 A | 11/2000 | Schuster et al. | 709/247 |
| 6,154,771 A | 11/2000 | Rangan et al. | 709/217 |
| 6,175,650 B1 | 1/2001 | Sindhu et al. | 382/171 |
| 6,175,663 B1 * | 1/2001 | Huang | 382/284 |
| 6,195,692 B1 * | 2/2001 | Hsu | 725/110 |
| 6,202,211 B1 | 3/2001 | Williams, Jr. | 725/78 |
| 6,205,485 B1 | 3/2001 | Kikinis | 709/231 |
| 6,208,354 B1 | 3/2001 | Porter | 345/435 |
| 6,215,904 B1 | 4/2001 | Lavallee | 382/234 |
| 6,226,642 B1 | 5/2001 | Beranek et al. | 707/10 |
| 6,243,388 B1 | 6/2001 | Mussman et al. | 370/420 |
| 6,278,466 B1 * | 8/2001 | Chen | 345/473 |
| 6,292,834 B1 | 9/2001 | Ravi et al. | 709/233 |
| 6,295,380 B1 * | 9/2001 | Takahashi | 382/240 |
| 6,311,197 B2 | 10/2001 | Mighdoll et al. | 707/513 |
| 6,356,664 B1 | 3/2002 | Dunn et al. | 382/239 |
| 6,381,748 B1 | 4/2002 | Lin et al. | 725/109 |
| 6,389,072 B1 | 5/2002 | Tzou et al. | 375/240 |
| 6,397,387 B1 | 5/2002 | Rosin et al. | 725/44 |
| 6,445,874 B1 * | 9/2002 | Catlow | 386/52 |
| 6,507,672 B1 | 1/2003 | Watkins et al. | 382/232 |
| 6,507,872 B1 | 1/2003 | Geshwind | 709/236 |
| 6,622,306 B1 | 9/2003 | Kamada | 725/109 |
| 6,646,677 B2 * | 11/2003 | Noro et al. | 348/156 |
| 6,675,386 B1 * | 1/2004 | Hendricks et al. | 725/105 |
| 6,721,455 B1 | 4/2004 | Gourdol | 382/232 |
| 6,754,905 B2 | 6/2004 | Gordon et al. | 725/38 |

FOREIGN PATENT DOCUMENTS

| | | |
|---|---|---|
| WO | PCT/IL98/00349 | 7/1998 |
| WO | PCT/IL99/00412 | 7/1999 |
| WO | PCT/IL99/00413 | 7/1999 |

OTHER PUBLICATIONS

U.S. Appl. No. 09/770,769, filed Jan. 25, 2001, Ofir Paz, et al.
U.S. Appl. No. 09/770,644, filed Jan. 25, 2001, Ofir Paz, et al.
U.S. Appl. No. 09/770,765, filed Jan. 25, 2001, Meir Feder, et al.
U.S. Appl. No. 09/770,766, filed Jan. 25, 2001, Ofir Paz, et al.
U.S. Appl. No. 10/975,693, filed Oct. 27, 2004, Ofir Paz, et al.
U.S. Appl. No. 10/976,063, filed Oct. 27, 2004, Ofir Paz, et al.
U.S. Appl. No. 09/744,771, filed Jan. 25, 2001, Ofir Paz, et al.
U.S. Appl. No. 09/744,662, filed Jan. 25, 2001, Ofir Paz, et al.

* cited by examiner

MULTIMEDIA STREAM COMPRESSION

RELATED APPLICATIONS

This application claims priority to under 35 USC §120 or §365(c) of PCT application No. PCT/IL98/00349 entitled Remote Computer Access filed Jul. 27, 1998.

BACKGROUND OF THE INVENTION

1. The Field of the Invention

The present invention relates to remote operation of computer systems and in particular to remote access to a computer running an Internet browser.

2. The Relevant Technology

Various methods of remotely accessing a computing server have been used in the past. One of the first methods utilized a server and terminals. Input is entered at the terminals, transmitted to the server and the results are send back over data lines to the terminals. The terminals can be "dumb" terminals, such as a VT52, with no processing power except to display the data, or they can be smart terminals, such as an IBM 3270, which can do some basic form filling without requiring intervention of the server.

As computing power has grown cheaper, various other strategies have been used. In the X11 graphical networking protocol, a display server sends bitmaps to a display client and receives input events from the client In the NeWS graphical networking protocol, a server sends short code segments to a client computer. The code segments perform display and input handling functions at the client and, when needed, send input to and receive display data from the server.

A somewhat different type of remote computer access is Internet-TV. A television set is upgraded using an electronic box so that the television may be used to access the Internet. In one system, Internet related data is transmitted to and from the electronic box using protocols which transmit data over a cable network~ In some instances, the data is transmitted using a data channel provided by an MPEG compression protocol. In one system, the box is a computer, which performs the Internet communication via the cable network and which uses the television as a display. In another system, a server at a cable center, sends graphical display commands to the box and the box generates a video signal responsive to the commands. Typically, the display commands are a subset of Java or HTML. In another system, the data comprises Java scripts which are executed by the box.

Cable networks have also long been used to send video and/or audio programs on demand to a particular subscriber. The video programs are compressed before sending so that a wider bandwidth is available over the cable networks. A set-top box at each subscriber is hardwired (and/or programmed) to decompress the video program and convert it into a video signal for the television. Such video on demand may be a live performance or may be retrieved from an archive. It is also possible to view video segments via the Internet.

Generally, when video is transmitted, a same bandwidth is allocated to a plurality of video channels. In packet based video transmission, subscribers and/or channels that require a higher data rate receive more packets per second than subscribers who need a lower data rate. A company named "iMedia" uses a method of statistical multiplexing in which bandwidth is dynamically allocated between video channels, based on signal characteristics of the video being transmitted. The allocation does not depend on the content per-se of the video channels. In fact, the statistical multiplexing is preferably affected without decompressing the images.

Related patent publications include U.S. Pat. Nos. 5,612,742, 5,687,257 and 5,115,309 and PCT publication WO 97/12486, the disclosures of which are incorporated herein by reference.

The following articles, "Polygon Assisted JPEG and MPEG Compression of Synthetic Images", by Marc Levoy, Proceeding of Siggraph 1995, "Model Based Motion Estimation for Synthetic Animations", by Maneesh Agrawala, Andrew C. Beers and Navin Chaddha, in ACM *Multimedia* 1995, and "Compression Performance of the Xremote Protocol", by John Danskin and Pat Hanrahan, *Proceedings* 1994 *Data Compression Conferences*, the disclosures of which are incorporated herein by reference, describe methods compressing animation into MPEG format, on a single machine. In these methods the compression is faster since the "video source", the animation, is completely known.

BRIEF SUMMARY OF THE INVENTION

One object of some embodiments of the present invention is to provide a client server protocol which operates via a cable network. Preferable, the server is used to connect to the Internet. Preferably, the client comprises a television and a set-top box.

An object of some preferred embodiments of the invention is to provide methods of more efficiently compressing video, which video is generated by a computer.

An object of some preferred embodiments of the invention is to provide methods of bandwidth allocation for cable-network systems where the data transmitted relates to computer communications. Preferably, the computer communications comprise compressed screen displays.

One aspect of some preferred embodiments of the present invention relates to providing remote computer access using compressed video. Preferably, one or more clients are connected to a single server using a cable network. Preferably, displays are sent from the server to the clients using compressed video, preferably using an MPEG II compression protocol. Preferably, the clients provide feedback to the server using data transmission over the cable network. Alternatively, the feedback may be provided over a telephone line.

Another aspect of some preferred embodiments of the invention relates to efficient video compression, especially MPEG II compression, of computer generated displays. Efficient compression may be faster, of a higher quality and/or be obtained using a cheaper hardware and/or software base. In one preferred embodiment of the invention, such efficient compression is achieved by bypassing motion estimation algorithms. Such bypassing may be achieved by taking note of display manipulation commands and tracking which portions of a display are changed and which are shifted. Display manipulation commands include, for example, scrolling commands and pan commands.

Alternatively or additionally, efficient compression is achieved by maintaining the compression of video, audio and/or still images which are retrieved by the server and sent to the client, instead of decompressing them and then compressing them again prior to sending them.

Alternatively or additionally, efficient compression is achieved by modifying a display, which would have been used for a user working on the server, so that it can be more efficiently compressed.

Alternatively or additionally, efficient compression is achieved by direct drawing of graphical elements of a display into a DCT space, instead of- or in addition to- drawing into an image space and then performing a transform.

Alternatively or additionally, efficient compression is achieved by reusing portions of a display and/or a DCT space, between images and/or between clients.

Another aspect of some preferred embodiments of the invention relates to image processing an image and/or a video stream. In a preferred embodiment of the invention, image processing of an image is combined with a compression stage by providing an image, compressing the image and image processing the image by manipulation of compression parameters and/or by processing of the compressed data. It should be appreciated that it would have been possible to process the image before compressing. However, in some cases, the image processing is more computational efficient by processing the compressed data. In a preferred embodiment of the invention, an image is low-pass filtered by reducing the quantization rate of low frequency components. In a preferred embodiment of the invention, only the vertical frequency components are modified, to reduce flicker in a reconstructed image. In another example a different wavelet resolution is used in a vertical direction of an image.

Another aspect of some preferred embodiments of the invention relates to asynchronic image compression and transmission. In a preferred embodiment of the invention, an image or an image portion is compressed in an asynchronic manner, for example, depending on available bandwidth, available computational power, indication of changes in the image, desirable image quality and/or type of change in the image. In a preferred embodiment of the invention, the display rate and/or the image generate rate are unaffected by the asynchronic characteristics of the data compression.

In a preferred embodiment of the invention, a compression step is prompted by an event which marks a change in the image. In a preferred embodiment of the invention, only the portions of the image which are affected by the event are compressed. A new image frame is created and sent to a decompression and display unit. Such a new image frame may comprise a completely new frame or a frame which defines changes over one or more previous frames. In a preferred embodiment of the invention, two change events may be combined in a single new frame. In some cases, one change event may moot a previous change event, so that only the changes associate with one event are processed.

In a preferred embodiment of the invention, the system may operate at several different frame rates simultaneously: image generation frame rate, actual compression frame rate, maximum compression frame rate and display frame rate. In a preferred embodiment of the invention, each of these frame rates may be independently varied, for example, the image generation rate may depend on a computer program which generates the image. The actual compression rate may depend on available computing power and/or on whether there were any changes in the frame. The maximum compression rate may be the maximum frame rate which is allocated for a particular user and may depend on a user request, available bandwidth and/or payment schedule. The display rate may depend on the characteristics of the display device, be it NTSC, PAL or HDTV. In a preferred embodiment of the invention, the actual compression rate and the display rate are synchronized by buffering the actually sent frames with "no change" frames, to maintain the display frame rate constant. In a preferred embodiment of the invention, the maximum frame rate determines the number of frames sent, with the balance between the maximum frame rate and the compression frame rate also being buffered using "no change" frames.

Alternatively or additionally, the MPEG decompression module may be modified to work with variable frame rates.

Another aspect of some preferred embodiments of the invention relates to bandwidth allocation between a plurality of clients. In accordance with one preferred embodiment of the invention, the compression depth is traded-off between the clients. Preferably, each client is provided with a minimum bandwidth according to his needs.

Alternatively or additionally, bandwidth is allocated by providing each client with a different frame rate. Typically, a 25/30 Hz (changed) frame rate is not needed in any computer application, so that a lower frame rate may generally be used for such applications.

Alternatively or additionally the bandwidth is allocated responsive to the amount of motion in the display for each client.

Another aspect of some preferred embodiments of the invention relates to adjusting the displayed information to match a particular compression required and/or display characteristics of a television used to display the data. In one example, a cursor flashing rate may be changed so that a lower frame rate is required. In another example, the colors of a displayed portion are adjusted so that compression of color components is more efficient. In still another example, display elements, such as bullets and letters are moved so that they do not straddle compression-block boundaries. In another example, a display background may be replaced by a different display background, for example to simplify compression or to utilize a pre-compressed background. Preferably, the background is compared to a set of stored background portions to determine which background is most similar. In a preferred embodiment of the invention, if all the pre-stored backgrounds are different by more than a threshold amount, the original background may be used. Alternatively or additionally, the original background may be modified to simplify compression. In a preferred embodiment of the invention, a background is analyzed to determine if it is unique and should not be replaced. Such an analysis may include, inter alia, analyzing the size of the background image, analyzing the contrast and/or analyzing the colors of the image. Generally, a garish, large and/or high contrast background is a unique background. Plain, simple and low-contrast backgrounds are generally "standard" and replaceable backgrounds. Preferably, when determining which background to replace the original background with, a plurality of parameters of the original background are used to select a match. Such parameters can include main color (a replacement background can be set to that color), spatial frequency spectrum (a background with a similar spectrum can be selected) and size (a background with a similar size and/or aspect ration may be selected). Alternatively or additionally, other display elements, such as icons, buttons, menus and fonts may also be replaced and/or modified in similar ways to a background.

Another aspect of some preferred embodiments of the invention relates to generating a plurality of content-unrelated compressed video streams from a single computer. In some preferred embodiments of the invention, such a single computer may include a plurality of processing units, sharing resources, such as memory and/or a main data bus. In a preferred embodiment of the invention, when a resource is not needed for the generation of one channel, that resource may be used by a second channel. In a preferred embodiment of the invention, at least some of the processing associated with the generation of both channels is performed on a single CPU. Preferably, a single computer generates displays for 4, 10 or even 20 channels, i.e., clients.

Another aspect of some preferred embodiments of the invention relates to a virtual device driver for an operating system, so that a plurality of full size windows may be displayed simultaneously on the virtual device, by a host computer. Preferably, each one of the full-size displays is converted into a separate and content-unrelated video stream. In a preferred embodiment or the invention, each window runs an instance of an Internet browser. In a preferred embodiment of the invention, the border and/or other portions of the browser are not shown. Alternatively or additionally, a control area may be optionally provided by server 16. Preferably, such a control area is overlaid on the display.

Another aspect of some preferred embodiments of the invention relates to broadcasting compressed video data packets representing a plurality of display channels, where some packets may be used for more than one channel. In one example, a packet including data corresponding to a menu portion of a web browser is utilized and decompressed by all the viewers which view that particular browser. In another example, when a plurality of viewers view a same TV or WWW channel, a temporal and/or spatial advertisement portion of the channel may be personalized for a particular viewer or for a group of users. The decompression unit at each different user or group or users preferably accepts different packets and thus may show different advertisements, on the same channel.

Another aspect of some preferred embodiments of the invention relates to treating WWW sites, radio stations, video on demand, cable channels and TV channels as different instances of multi-media presentation channels. In a preferred embodiment of the invention, some WWW sites, such as CNN, Microsoft and the local weather are set up as permanent channels. In some preferred embodiments of the invention the interactivity of a channel may be reduced in order to allow more channels in a given bandwidth.

In a preferred embodiment of the invention, such channels may be switched between and viewed on a single display device, such as a TV or a computer display. Alternatively or additionally, links may be defined between portions of such channels and portions of other such channels. Preferably, a user may follow such links to switch between channels. Alternatively or additionally, a user may view a plurality of such channels simultaneously and/or in an overlay. In a preferred embodiment of the invention, linking from a TV channel is enabled by an overlay which indicates which portions of the channel include links and/or where such links point. In a preferred embodiment of the invention, such links may be dynamic and/or track portions of the image. An audio channel or a TV channel may include an associated visual display of links and/or may include voice annotations informing of links. In a preferred embodiment of the invention, a link may be selected by a voice command. In a preferred embodiment of the invention, the links are personalized to match a particular viewer.

In a preferred embodiment of the invention, a web site may be used to browse TV channels. When a particular link on the web site is followed, a corresponding TV channel may be displayed. In a preferred embodiment of the invention, a cable operator may provide a WWW interface to browsing a TV channel catalog and especially a video- on-demand catalog.

In a preferred embodiment of the invention, advertisements in the multimedia channels are treated in aggregate. Thus, advertisements may be personalized for a particular viewer, depending on the user, for all the different types of multimedia channel. Generation of advertisements, tracking of user viewing and selection of advertisements shown may be effected using a single system, albeit possibly with different accounting for the different types of channels.

There is therefore provided in accordance with a preferred embodiment of the invention, a method of remote computer access, comprising:
  executing a program at a first location, to generate display commands;
  converting said display commands directly into a compressed video data stream;
  transmitting said compressed data stream to a second location, remote from said first location;
  decompressing said compressed data stream at the second location; and
  displaying the decompressed data stream as an image at the second location.

Preferably, executing a program at a first location comprises executing a program on a general purpose computer at said first location. Alternatively or additionally, displaying the decompressed data comprises displaying the decompressed data on a TV set. Alternatively or additionally, transmitting said compressed data comprises transmitting said compressed data over a television distribution network. Preferably, said network comprises a cable network.

Alternatively or additionally, said decompressing comprises decompressing using a cable TV set-top box. Alternatively or additionally, said program comprises a word processor.

In a preferred embodiment of the invention, said program comprises a game program. Preferably, said program communicates with at least a second program executed on said general purpose computer.

In a preferred embodiment of the invention, said program accesses data stored in association with said general purpose computer. Preferably, said decompressed data stream comprises audio recordings. Preferably, the method comprises tracking access to said audio recordings for royalty payment assessment.

In a preferred embodiment of the invention, said program comprises a browser which accesses a third location, remote from said first and said second locations. Preferably, second remote location is accessed via an Internet.

In a preferred embodiment of the invention, said compressed video stream represents an entire TV display.

Preferably, the method comprises transmitting user inputs from said remote location to said first location, responsive to said display.

There is also provided in accordance with a preferred embodiment of the invention, a remote computing server system, comprising:
  a server, executing a plurality of programs, each of which generates a set of display commands; and
  a video compressor which receives the plurality of sets of display commands and generates a compressed video stream from each one of said sets. Preferably, the server comprises a mixing box which multiplexes said video streams unto a cable transmission network. Alternatively or additionally, said server comprises a mixing box which multiplexes said video streams unto a satellite transmission network.

There is also provided in accordance with a preferred embodiment of the invention, a method of video transmission, comprising:
  executing, at a server computer, a plurality of programs, each of said programs generating a display responsive to an Internet connection; and
  transmitting each of said displays to a different remote location, wherein said displays are transmitted as compressed video streams.

Preferably, each of said programs is connected to a different Internet address. Alternatively or additionally, each of said programs generates a set of display commands and said compressed video steams are directly generated from said sets of display commands. Preferably, the method comprises generating said compressed video streams responsive to known visual limitations at said remote locations. Alternatively or additionally, the method comprises generating said compressed video streams responsive to bandwidth limitations on said transmission. Alternatively or additionally, the method comprises degrading said display commands responsive to bandwidth limitations on said transmission.

There is also provided in accordance with a preferred embodiment of the invention, a multi-headed display generator, comprising:
  at least one CPU running at least one program, each of said programs generating at least one set of display commands, wherein said programs generate in totality at least two sets of content independent display commands; and
  at least one compressor which converts said two sets of display commands into two simultaneous compressed video streams,
  wherein said compression of the said sets utilizes at least one shared resource of said generator.

Preferably, said resource comprises CPU resources. Alternatively or additionally, said resource comprises memory resources. Alternatively or additionally, said generator trades off the compression of one set of display commands with the compression of a second set of display commands.

Preferably, said trade-off comprises trading off quality between the two command sets. Alternatively or additionally, said trade-off comprises trading off frame rate between the two command sets.

In a preferred embodiment of the invention, said generator statistically multiplexes said compressed video streams onto a single transmission bandwidth.

There is also provided in accordance with a preferred embodiment of the invention, a method of generating a compressed video stream, comprising:
  receiving a plurality of display commands; and
  directly converting said commands into a compressed video stream, without first generating a display raster.

There is also provided in accordance with a preferred embodiment of the invention, a method of generating a compressed video stream, comprising:
  receiving a plurality of display commands; and
  directly converting said commands into said compressed video stream, wherein said converting comprises motion estimation and wherein said motion estimation is performed directly on said commands without first generating a display raster.

There is also provided in accordance with a preferred embodiment of the invention, a method of generating a compressed video stream, comprising:
  receiving a plurality of display commands; and
  directly converting said commands into said compressed video stream, wherein said converting comprises change detection and wherein said change detection is performed directly on said commands without first generating a display raster.

There is also provided in accordance with a preferred embodiment of the invention, a method of motion estimation for image stream compression, comprising:
  providing a plurality of display commands;
  identifying display manipulation commands among said commands which manipulation commands manipulate image portions in said image stream, said portions being generated by other display commands among said plurality of display commands; and
  generating at least one motion vector, responsive to said identified display manipulation commands.

Preferably, said display manipulation commands include a scroll command. Alternatively or additionally, said display manipulation command is generated as a direct result of a display of a downloaded image in a WWW browser. Alternatively or additionally, the method comprises reducing a difficulty of said motion vector generation by modifying said display manipulation commands.

Preferably, scroll-type display modification commands are limited to multiples of a compression block size dimension.

There is also provided in accordance with a preferred embodiment of the invention, a method of change detection for image stream compression, comprising:
  providing a plurality of display commands;
  identifying commands of said plurality of commands which affect image portions in said image stream;
  identifying said image portions; and
  determining if a change in one of said image portions requires image information to be included in said image stream.

Preferably, said determining comprises determining if said change is greater than a change threshold.

There is also provided in accordance with a preferred embodiment of the invention, a method of generating a compressed video stream, comprising:
  providing a plurality of display commands;
  directly setting values in a transform space, responsive to said display commands; and
  creating a compressed video stream utilizing said set values.

Preferably, said transform space comprises a DCT space. Alternatively or additionally, directly setting comprises utilizing transform coefficients from a look-up table. Alternatively or additionally, directly setting comprises copying transform coefficients from a look-up table of transformed graphical primitives. Alternatively or additionally, wherein directly setting comprises copying transform coefficients from a cache of transformed image portions. Alternatively or additionally, directly setting comprises rendering said display command into said transform space utilizing an analytical formula associating a graphical primitive defined by said display command with said transform space.

In a preferred embodiment of the invention, the method comprises modifying at least one of said display commands so that a graphical primitive defined by said at least one display command does not straddle an image block, for which block a set of transform coefficients are defined according to a compression protocol utilized by said compressed image stream.

There is also provided in accordance with a preferred embodiment of the invention, a method of generating a catalog, comprising:
  providing a plurality of display elements;
  generating a compressed video representation of each one of said elements; and storing said compressed representations in a memory, indexed by element.

Preferably, said display elements comprise GUI (graphical user interface) objects.

There is also provided in accordance with a preferred embodiment of the invention, a method-of-generating a catalog, comprising:
  receiving, during interaction with an Internet, a plurality of objects to be displayed;

generating a compressed video representation of each one of said objects; and storing said compressed representations in a cache of objects, whereby when one of said objects is received again from said Internet at a later time, a earlier stored compressed representation is used for display generation.

Preferably, said stored objects comprise at least one JPEG image. Alternatively or additionally, said stored objects comprise at least one uncompressed image. Alternatively or additionally, said stored objects comprise a WWW page.

There is also provided in accordance with a preferred embodiment of the invention, a method of Internet browsing, comprising:

connecting to an Internet;

receiving over said Internet at least one object to display;

retrieving a compressed representation of said object from a catalog; and generating a compressed video stream utilizing said compressed representation.

Preferably, said object comprises a WWW page.

There is also provided in accordance with a preferred embodiment of the invention, a method of generating a compressed video stream, comprising:

generating a plurality of display commands which represents a display, by a program;

modifying at least one of said display commands, independently of said program;

generating a compressed video stream utilizing said display commands.

Preferably, said modifying comprises modifying said commands to responsive to limitations of a display device on which said compressed video stream is to be displayed. Alternatively or additionally, modifying comprises modifying said commands to reduce bandwidth requirements of said compressed video stream. Alternatively or additionally, modifying comprises modifying said commands to reduce resource requirements for compressing said compressed video stream. Alternatively or additionally, at least one of said display commands represents an object and said modifying comprises changing said at least one display command such that the object is moved relative to its original display position.

Preferably, said compressed video stream comprises utilizes blocks having boundaries and wherein moving comprises moving said object to match at least one compression block boundary.

In a preferred embodiment of the invention, at least one of said display commands represents an object and said modifying comprises replacing said object with a different object.

Preferably, replacing said object comprises replacing said object with a compressed representation of said different object. Alternatively or additionally, said object comprises a text object. Alternatively or additionally, said object comprises a background of said display. Alternatively or additionally, the method comprises analyzing said object to determine a closest suitable replacement object.

In a preferred embodiment of the invention, modifying said object comprises changing a font definition for said object. Alternatively or additionally, modifying said object comprises modifying at least one color of said object. Alternatively or additionally, modifying a color comprises reducing a spatial resolution of said colors. Preferably, modifying a color comprises reducing a color range resolution of said colors.

Alternatively or additionally, modifying said object comprises reducing a spatial resolution of said object.

In a preferred embodiment of the invention, at least one of said display commands comprises a scrolling command and wherein said modifying comprises increasing a granularity of said scrolling. Preferably, said increasing a granularity comprises limiting said scrolling command to multiples of compression blocks size of said compressed stream.

There is also provided in accordance with a preferred embodiment of the invention, a method of generating a compressed video stream, comprising:

generating a plurality of display commands which represents a display;

generating a plurality of transform coefficients from said display commands, wherein said transform coefficients are quantized and wherein said quantization is modified responsive to limitations a display device on which said compressed video stream is to be displayed; and creating a compressed video stream utilizing said coefficients.

Preferably, said coefficients are quantized at a lower resolution in a vertical direction of said display.

There is also provided in accordance with a preferred embodiment of the invention, a method of generating a compressed video stream, comprising:

providing a display definition including a compressed object; and converting said display definition into a compressed video stream, wherein converting includes transcribing at least a portion of said compressed object, without decompressing said compressed object.

Preferably, transcribing comprises reducing a quality level of said compressed object. Alternatively or additionally, said compressed stream and said compressed object are compressed utilizing a same transform and transcribing comprises copying transform coefficients from said compressed object to said compressed video stream. Alternatively or additionally, said compressed stream and said compressed object are compressed utilizing a motion estimation representation and transcribing comprises copying motion estimation vectors from said compressed object to said compressed video stream. Alternatively or additionally, converting said display definition comprises directly converting said display representation into said compressed video stream, without generating an intermediate image raster. Alternatively or additionally, said compressed object comprises a second compressed video stream, covering only a portion of said display. Alternatively or additionally, said compressed object comprises a compressed image, covering only a portion of said display. Alternatively or additionally, said compressed object comprises a compressed audio stream.

There is also provided in accordance with a preferred embodiment of the invention, software program for WWW page design, comprising:

a computer readable media having stored thereon:

a restriction module which receives restrictions defining limitations imposed by a compression method to be used for displaying WWW pages; and a design module, which lays out display elements, responsive to said received limitations.

Preferably, said restrictions include a block size definition. Alternatively or additionally, said restrictions include a bandwidth restriction, and wherein laying out of display elements comprises selecting display elements to match said bandwidth limitations. Alternatively or additionally, said media has stored thereon an automated WWW page generator for a WWW server. Preferably, the software comprises a communication module for receiving said restrictions from a server associated with said compression.

There is also provided in accordance with a preferred embodiment of the invention, a compression-modified software for performing at least one function and for generating at least one display, comprising:

a computer readable media having stored thereon:
   a functional module which performs said function; and
   a compression-responsive module which receives an indication of restrictions related to a compression of said display and which controls said module to generate a display responsive to said indication, wherein said display is modified relative to a display generated without said restrictions.

Preferably, said indication comprises a message from a computer on which said software is executed. Alternatively or additionally, said indication comprises a configuration file. Alternatively or additionally, said modified display is modified to meet a bandwidth requirement. Preferably, said bandwidth requirement is an instantaneous band-width requirement.

In a preferred embodiment of the invention, said modified display is modified to reduce resources required for compression. Alternatively or additionally, said display is modified by moving at least one object, relative to its display location for a non-compressed display. Alternatively or additionally, said display is modified by utilizing a different object for a compressed display than for a non-compressed display. Alternatively or additionally, said function comprises a WWW browsing function.

There is also provided in accordance with a preferred embodiment of the invention, a method of display control, comprising:

transmitting a request, from a generator of a compressed video stream, to a source of display commands, which requests relates to said compression; and modifying a generation of display commands, at said source, responsive to said request.

Preferably, said source of display commands comprises a WWV browser.

There is also provided in accordance with a preferred embodiment of the invention, a method of image processing, comprising:

providing an image to be compressed for transmission;
simultaneously compressing and processing said image;
transmitting said image to a remote location; and
decompressing said processed image at said remote location.

Preferably, said simultaneously compressing and processing comprises processing said image by modifying a quantization of at least one transform coefficient of said image. Alternatively or additionally, said modifying comprises increasing a quantization granularity for vertical coefficients.

There is also provided in accordance with a preferred embodiment of the invention, a method of generating a compressed video stream, comprising:

accumulating a plurality of display commands; identifying at least one display command of said plurality, whose effect is mooted by a later accumulated display command; and converting said commands into said compressed video stream, ignoring the mooted display command.

Preferably, said mooted display command is ignored if its effect on said compressed video stream, in view of said later command, is below a threshold value. Alternatively or additionally, converting said commands comprises combining display commands. Alternatively or additionally, said converting comprises directly converting said commands into said compressed video stream without first generating an image raster.

There is also provided in accordance with a preferred embodiment of the invention, a method of video compression, comprising:

generating a display, which generation is refreshed at a generation refresh frame rate;
compressing, transmitting and decompressing said display; and
displaying said display at a second refresh rate other than said generation refresh rate and wherein said refresh is not synchronized to said display refresh rate. Preferably, said compressing is un-synchronized with said generation refresh frame rate. Alternatively or additionally, said transmitting is un-synchronized with said compressing.

There is also provided in accordance with a preferred embodiment of the invention, a method of generating a compressed video stream, comprising:

generating a plurality of display commands;
accumulating at least one display command;
generating a compressed video stream from said accumulated display commands, wherein accumulating comprises accumulating a number of display commands responsive to instantaneous available resources.

There is also provided in accordance with a preferred embodiment of the invention, a method of generating a compressed video stream, comprising:

generating a plurality of display commands;
accumulating at least one display command;
generating a compressed video stream from said accumulated display commands, wherein accumulating comprises accumulating a number of display commands responsive to a desired output frame rate.

In a preferred embodiment of the invention, generating a compressed video stream is un-synchronized relative to said generation of display commands. Preferably, said display commands are generated in sets, each set associated with a display frame and wherein said accumulating, in a single accumulation set, display commands originating from different sets, wherein said single accumulation set is utilized for generating a single frame of said compressed video stream.

Alternatively or additionally, the method comprises assigning a priority to a display command. Preferably, the method comprises reordering said accumulated display commands, responsive to said priority, wherein generating a compressed video stream comprises generating a first frame in said compressed video stream utilizing an originally later display command, prior to generating a frame in said stream utilizing an originally earlier display command.

There is also provided in accordance with a preferred embodiment of the invention, a method of generating a compressed video stream, comprising:

generating a plurality of display commands;
generating a compressed image portion responsive to said display commands; and
assembling a compressed video stream from said compressed image portion and from at least one previously compressed image portion, created prior to generation of said display commands.

Preferably, said previously compressed image portion comprises an image portion created for a previous image of said video stream.

There is also provided in accordance with a preferred embodiment of the invention, a method of asynchronous video stream compression, comprising:

providing a first data source and a second data source;
converting said first data source into a first portion of a compressed video stream;

converting said second data source into a second portion of a compressed video stream; and mixing said first portion and said second portions to create a single compressed video stream, wherein said first portion and said second portion temporally overlap in said single compressed video stream.

Preferably, said first portion and said second portion utilize different frame rates. Alternatively or additionally, said first portion and said second portion occupy different spatial areas in a display defined by said single compressed video stream. Alternatively or additionally, said first and said second data sources comprise sets of display commands. Preferably, converting said first data source and converting said second data source comprises directly converting said data sources without generating an intermediate image raster.

In a preferred embodiment of the invention, at least one of said first data source and said second data source comprises an image source. Alternatively or additionally, said first data source comprises a display portion affected by a command entered by a user who views said single compressed video source. Preferably, the method comprises identifying portions of a data display which are affected by said user command.

There is also provided in accordance with a preferred embodiment of the invention, a method of generating a compressed video stream, comprising:

executing a program, which program generates a set of display commands, representative of a display;

identifying changes in said display which are responsive to at least one type of user command; and converting said display commands into a compressed video stream,
wherein said changes are inserted into said compressed video stream at a higher frame rate than other changes in said display.

Preferably, said type of user command comprises a pointing device command. Alternatively or additionally, said changes comprises an indication of a selection of a GUI (graphical user interface) element. Alternatively or additionally, the method comprises analyzing said user command to determine display commands which effect said identified changes.

There is also provided in accordance with a preferred embodiment of the invention, a method of frame rate buffering comprising:

providing a source of compressed video which generates a compressed video stream having a variable frame rate;

providing a video display unit which receives said compressed video frames, decompresses said video frames and displays said video frames, wherein said unit is constrained to a fixed frame rate; and padding said generated compressed video frames with frames which indicate that no change has occurred, to achieve said fixed frame rate.

Preferably, the method comprises increasing said padding and decreasing said variable rate, to compensate for bandwidth limitation in transmission between said source and said display unit. Alternatively or additionally, the method comprises increasing said padding and decreasing said variable rate, to compensate for an instantaneous resource limitation at said source.

There is also provided in accordance with a preferred embodiment of the invention, a method of personalizing advertising, comprising:

providing a compressed video stream; and replacing at least one spatial portion of said compressed video stream with compressed data representing at least one advertisement, wherein said replacement is responsive to information associated with a viewer of said video stream.

Preferably, providing a compressed video stream comprises converting a computer software generated display into said compressed video stream. Preferably, said converting comprises directly converting a sequence of display commands generated by said software into said compressed video stream. Alternatively or additionally, said advertisement replaces a display object of said display. Alternatively or additionally, said replacing comprises replacing without decompressing said compressed video stream.

There is also provided in accordance with a preferred embodiment of the invention, a method of advertisement, comprising providing a compressed video stream, representing a display;

determining an available portion of said display; and inserting an advertisement into said available portion of said display, wherein inserting comprises manipulating said compressed video stream, without decompressing said compressed video stream.

Preferably, determining an available portion comprises receiving at least one indication of said available portion. Preferably, providing a compressed video stream comprises retrieving said stream from an archive location, wherein said archive location includes a storage of said indications.

Alternatively or additionally, providing a compressed video stream comprises converting a computer software generated display into said compressed video stream. Preferably, said software provides said indication. Alternatively or additionally, the method comprises analyzing said display to determine said available portion. Preferably, analyzing said display comprises analyzing display commands generated by said software.

In a preferred embodiment of the invention, said software comprises a WWW browser. Preferably, analyzing said display comprises identifying display areas into which additional display material is being downloaded.

There is also provided in accordance with a preferred embodiment of the invention, a charge accumulation method, comprising:

tracking a plurality of display transmissions from a server generating compressed video streams to a display unit which displays said streams, which transmissions utilize a variable video stream quality;

determining, for each transmission, a quality level of the video stream; and generating a charge for using said transmissions, utilizing said determined quality levels.

Preferably, said display transmissions comprise TV program transmission. Alternatively or additionally, said display transmission comprises a transmission of a computer generated display. Preferably, said computer generated display comprises a WWW browser display.

In a preferred embodiment of the invention, generating a charge comprises generating a charge responsive to a predetermined quality level.

There is also provided in accordance with a preferred embodiment of the invention, a method of interactive TV, comprising:

displaying, at on an interactive TV, a WWW page including indications for TV channels;

detecting an interaction of a user with one of said indications; and displaying a TV channel on said interactive TV responsive to said detection of interaction.

Preferably, said TV channel comprises a pay-on-demand movie.

There is also provided in accordance with a preferred embodiment of the invention, a method of interactive TV, comprising:
  providing a compressed video stream representing a TV channel;
  overlaying on said compressed video stream an interaction layer, including at least one control;
  receiving from a viewer of said video stream an interaction with said control, wherein said overlaying comprises overlaying a compressed interaction layer on said compressed video, without decompressing said compressed video; and
  modifying said compressed video stream responsive to said received interaction.

There is also provided in accordance with a preferred embodiment of the invention, a method of bandwidth allocation for a compressed video stream, comprising:
  generating a plurality of display commands, by executing a computer program;
  converting said display commands into a compressed video stream;
  estimating a future content of said video stream; and
  allocating bandwidth resources responsive to said estimate.

There is also provided in accordance with a preferred embodiment of the invention, a method of bandwidth allocation for a compressed video stream, comprising:
  generating a plurality of display commands, by executing a computer program;
  converting said display commands into a compressed video stream;
  estimating a future content of said video stream; and
  allocating CPU resources for compression responsive to said estimate.

In a preferred embodiment of the invention, said program comprises a WWW browser. Preferably, estimating comprises identifying a future download of complex display data. Alternatively or additionally, estimating comprises identifying a future download of a continuous data stream.

There is also provided in accordance with a preferred embodiment of the invention, a method of bandwidth allocation for transmitting video on a cable network, comprising:
  providing a plurality of data sources;
  differentially converting said data sources into compressed video streams, responsive to an instantaneous resource restriction; and
  multiplexing said compressed video streams on a single transmission line.

Preferably, said differentially converting comprises converting each data source to a different frame rate compressed video stream. Alternatively or additionally, said differentially converting comprises, converting each data source to a different frame quality level. Alternatively or additionally, said resource restriction comprises a bandwidth restriction. Alternatively or additionally, said resource restriction comprises a computing resource restriction. Alternatively or additionally, said data sources comprise display commands. Alternatively or additionally, said differentially converting comprises differentially converting responsive to a content of said data sources. Preferably, the method comprises providing an indication of said content with said data sources. Alternatively or additionally, the method comprises providing an indication of said content by analyzing display commands which are comprised in said data sources. Alternatively or additionally, the method comprises providing an indication of said content by a software which generates at least one of said data sources.

There is also provided in accordance with a preferred embodiment of the invention, a method of generating a plurality of displays, comprising:
  generating a first set of display commands, by a first program;
  generating at least a second set of display commands, by at least a second program;
  differentially affecting said first and said second programs, to generate said display commands; and
  converting each of said first and said second sets of display commands into a compressed video stream,
  wherein said differentially affecting comprises differentially affecting to meet an instantaneous resource limitation.

There is also provided in accordance with a preferred embodiment of the invention, a method of generating a plurality of displays, comprising:
  generating a first set of display commands, by a first program;
  generating at least a second set of display commands, by at least a second program;
  differentially modifying said first and said sets of display commands; and
  converting each of said first and said second sets of display commands into a compressed video stream,
  wherein said differentially modifying comprises differentially modifying to meet an instantaneous resource limitation.

In a preferred embodiment of the invention, said resource limitation comprises a transmission bandwidth limitation. Alternatively or additionally, said resource limitation comprises a limitation on CPU available to perform said conversion.

There is also provided in accordance with a preferred embodiment of the invention, a method of bandwidth allocation, comprising:
  providing a distribution network having a bandwidth;
  transmitting on said network a plurality of channels, comprising Internet channels and TV channels; and
  dynamically allocating bandwidth between Internet channels and TV channels.

There is also provided in accordance with a preferred embodiment of the invention, a method of transmitting a plurality of similar compressed video channels, comprising:
  transmitting a base compressed image stream on a first channel;
  transmitting modifications to said base image stream on at least one second channel;
  receiving, at a display location, said first and said second channel;
  modifying said first channel utilizing said second channel; and
  displaying said modified first channel at said display location.

Preferably, one channel of said at least one second channel is targeted for said display location. Alternatively or additionally, transmitting comprises transmitting over a satellite network. Alternatively or additionally, different display locations utilize different ones of said at least one second channel to modify said first channel. Alternatively or additionally, said first channel carries a TV program and wherein said at least one second channel carries advertisements. Alternatively or additionally, said first channel carries a WWW site and wherein said at least one second channel carries personalizations of said site. Alternatively or additionally, said personalization comprises a scrolling of an object in said site. Alternatively or additionally, the method comprises assigning a third channel for use as a base image channel for said display unit, responsive to an interaction with said WWW site. Alternatively or additionally, the method comprises modifying an interactivity level of said site responsive to an availability of channels.

There is also provided in accordance with a preferred embodiment of the invention, a method of statistical bit multiplexing, comprising:
providing a plurality of compressed video streams to be multiplexed;
providing, for at least one of said plurality of streams, side information, indicative of a content of a frame of said stream; and
differentially dropping bits from said at least one of plurality of streams, responsive to said side information.

Preferably, said side information includes a minimal quality level for said frame.

There is also provided in accordance with a preferred embodiment of the invention, a method of generating a plurality of unrelated image streams, comprising:
defining a virtual display on a computer;
executing a plurality of programs on said computer, each program outputting to a different section of said display;
capturing, form each program, display commands for said display; and
converting each of said sets of display commands into an image stream having a content unrelated to image streams converted from other of said sets of display commands.

Preferably, said image streams comprise compressed image streams.

There is also provided in accordance with a preferred embodiment of the invention, a method of generating a plurality of unrelated audio streams, comprising:
providing a computer;
defining at least one virtual audio output on said computer;
executing a plurality of programs on said computer, each program outputting to said at least one audio output;
capturing, for each program, audio commands for said at least one audio output; and
converting each of said sets of audio commands into an audio stream having a content unrelated to audio streams converted from other of said sets of audio commands.

There is also provided in accordance with a preferred embodiment of the invention, method of producing different display representations at a plurality of remote locations, comprising:
transmitting a digitally encoded representation of a base display to a plurality of remote locations;
transmitting a plurality of representations of modifications of said base display;
receiving at a plurality of display locations said base display and at least one representation of a modification; and
reconstructing at said display locations, said display representations, from said base representation and said at least one modification representations.

Preferably, said representations comprise HTML files. Alternatively or additionally, said representations comprise sets of display commands. Alternatively or additionally, said representations comprise programs in a display generation language. Preferably, the display generation language comprises JAVA.

BRIEF DESCRIPTION OF THE DRAWINGS

The invention will be more clearly understood by reference to the following description of preferred embodiments thereof in conjunction with the figures, wherein identical structures, elements or parts which appear in more than one figure are labeled with the same numeral in all the figures in which they appear, in which.

DETAILED DESCRIPTION OF THE PREFERRED EMBODIMENTS

Figure 1:
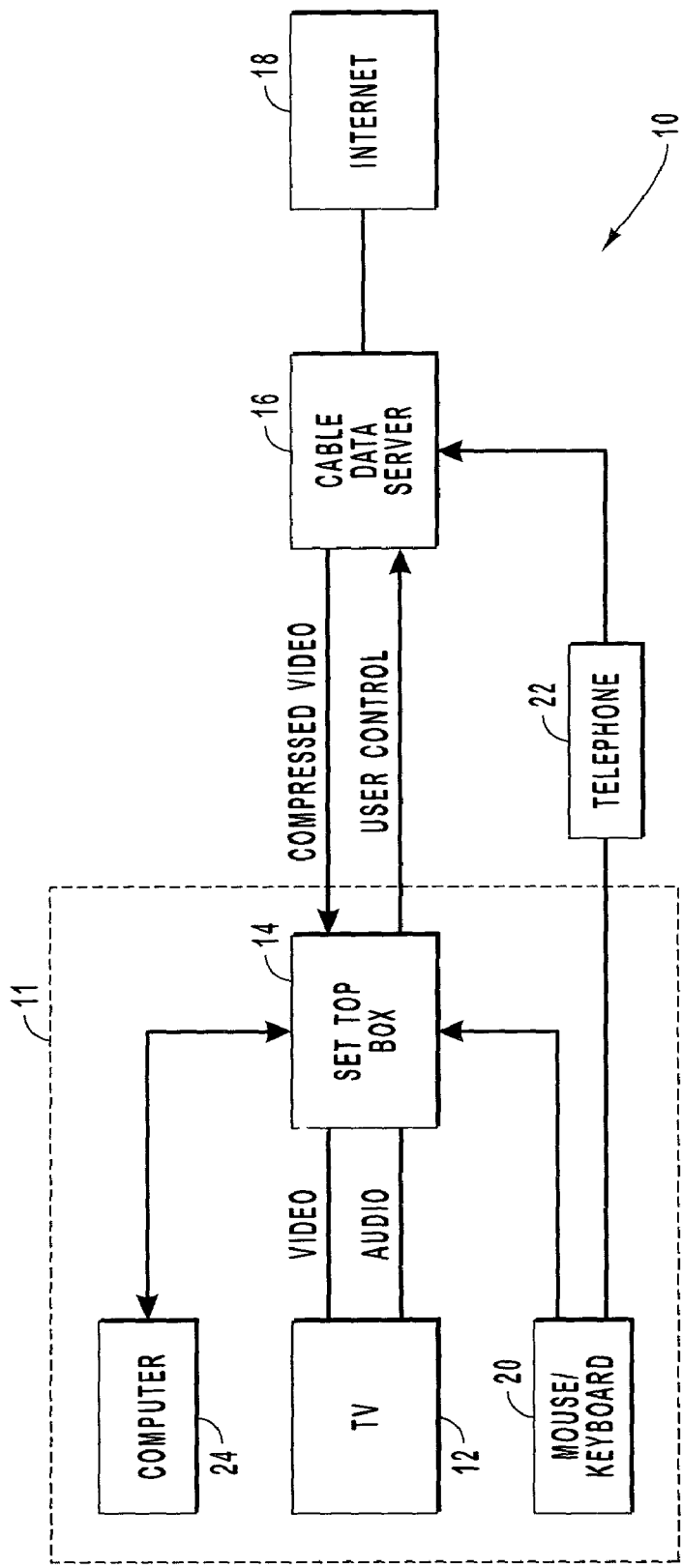
FIG. 1 schematically illustrates a client/server configuration, in accordance with a preferred embodiment of the invention.

FIG. 1 schematically illustrates a client/server configuration 10, in accordance with a preferred embodiment of the invention. A server 16 communicates with a client 11, using a compressed video signal. Typically, a single server 16 is connected to and services a large number of clients 11. Client 11 comprises a video display, preferably a television set 12 (TV). The compressed video signal is preferably received by a set-top box 14 which decompresses the compressed signal and sends a video signal to TV 12. In a preferred embodiment of the invention, set-top box 14 is also used for viewing cable channels and/or pay-per-view programs.

In a preferred embodiment of the invention, client 11 includes input devices 20, preferably a mouse and/or a keyboard. Alternatively, a remote-control with a small number of buttons is used for input. Input devices 20 may be connected to server 16 via a cable downlink connection, such as through set-top box 14. Such connections are well known in the art and may be used for transmitting small amounts of information back to a cable server. One such connection is made by the NCI corporation (network Computer Inc.). Alternatively or additionally, the connection may be via a telephone connection 22. In a preferred embodiment of the invention, user information, such as images and e-mail letters are faxed to server 16.

In a preferred embodiment of the invention, input devices 20 are wireless, such as infrared or ultrasonic, and set-top box 14 or telephone connection 22 include a suitable detector.

In some preferred embodiments of the invention, client 11 may comprise a computer 24 which can perform both the decompression and the display. Alternatively or additionally, the compressed video stream is used to carry data, preferably on a data channel of the compression protocol, to computer 24, from server 16. Such data communications may additionally or alternatively lead from computer 24 directly to server 16. Alternatively or additionally, input devices of computer 24, such as a mouse, may be used as an input device 20.

In one preferred embodiment of the invention, a direct computer/server connection is used to upload files to server 16 for transmission elsewhere and/or for downloading data files from the Internet.

In a preferred embodiment of the invention, server 16 is connected to an Internet 18 and client 11 is used to browse the Internet. Alternatively, server 16 may run other programs, such as a word processor, a spread-sheet or a computer game. In a preferred embodiment of the invention, the program executed by server 16 is a program which manages a subscriber's interaction with the cable company. In another preferred embodiment of the invention, the program is an e-mail program.

In one preferred embodiment of the invention, a program executed on server 16 may be used to browse data stored at server 16, for example DVD multimedia, in a preferred embodiment of the invention, server 16 maintains a copy of information which is often downloaded from the Internet, so that it can be simply and quickly browsed. Such information preferably includes, games, images, on-line journals and/or and data which is often downloaded and/or downloaded by more than a certain number of users.

Figure 2:
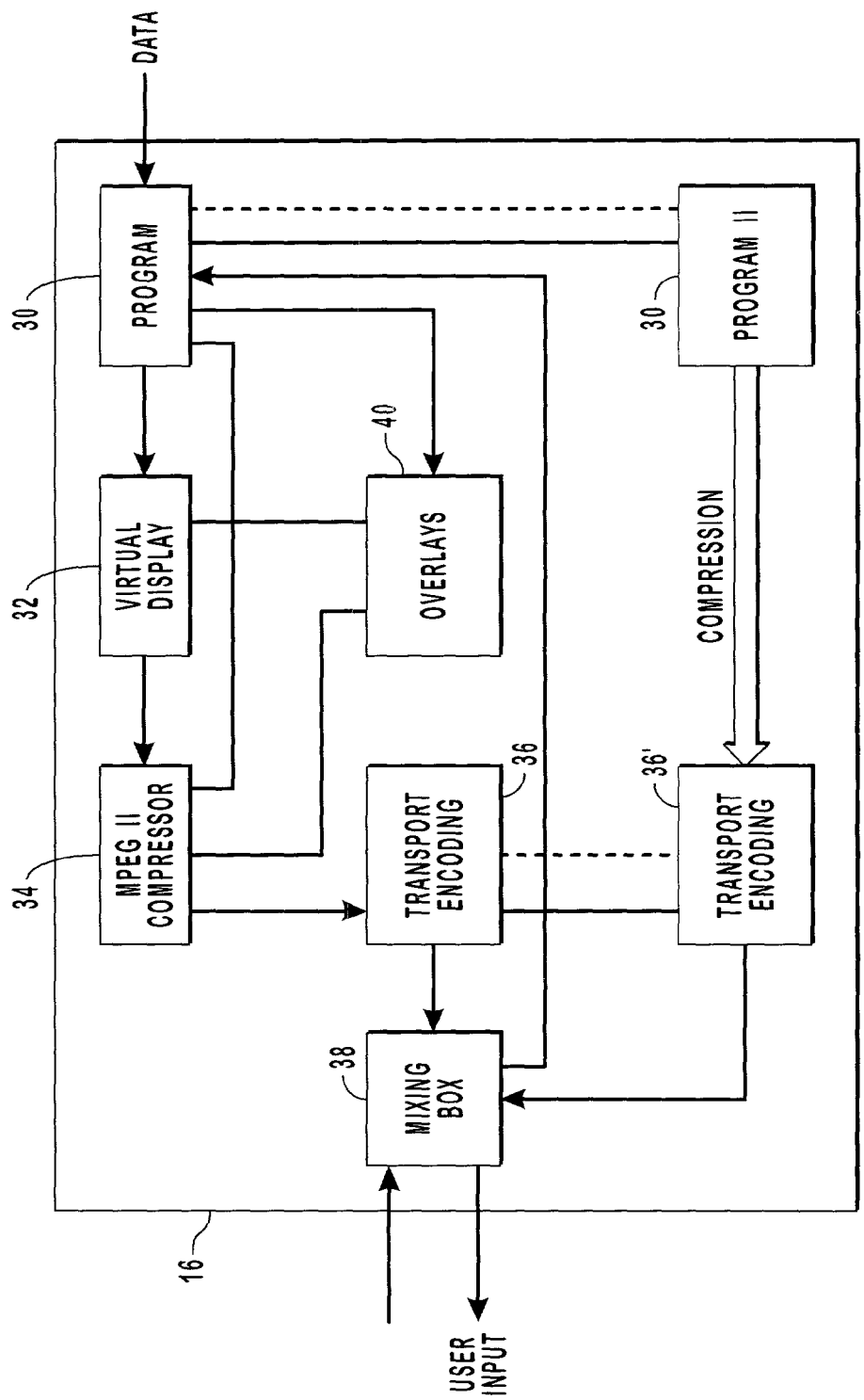
FIG. 2 schematically illustrates a server, in accordance with a preferred embodiment of the invention.

FIG. 2 schematically illustrates a server 16, in accordance with a preferred embodiment of the invention. A program 30 is run at server 16 and generates a display to be viewed. This display is preferably drawn in a window on a virtual display 32. The window portion of display 32 is compressed, preferably to comply with the MPEG II standard. This compression may be performed by a standard MPEG II compressor. However, in a preferred embodiment of the invention, a special MPEG compression algorithm is used which take into account the type of display being generated.

It should be appreciated that although an MPEG II compression is assumed in many of the examples described herein, the invention is not limited to being used with MPEG II compression. Rather, many other compression mechanisms may be used, including advanced versions of MPEG, Quick time, wavelet compression, AVI and propriety compression protocols used by some multimedia data compressors.

The compressed display is then preferably physically encoded using a transport encoder 36 and mixed into an output video stream using a mixing box 38. User input is preferably filtered out by mixing box 38 and then directed to program 30, in a manner which emulates natural keyboard and/or mouse input to the program. Alternatively or additionally, especially when a special input device 20 is used, for example a remote, a special device driver in server 16 converts the user input into a format which can be assimilated by program 30.

In a preferred embodiment of the invention, server 16 runs a plurality of programs 30', the displays of which are all compressed, encoded and mixed into a cable wire signal. Preferably, the plurality of programs all run on a single CPU. Alternatively or additionally, server 16 may comprise a multi-CPU platform. Preferably, all the programs share a single virtual display. Alternatively, at least some of the programs may utilize a separate virtual display. Preferably, MPEG compression processes for a plurality of programs are performed by the same CPU. Alternatively, server 16 may include a plurality of DSP cards, which can be dynamically assigned to perform the compression. Preferably, all the compressed displays are transport encoded using a single transport encoder, alternatively a plurality of encoders may be used. Preferably, such a plurality of encoders are dynamically assigned for a display frame. Preferably, the encoders are genlocked and/or frame locked.

In a preferred embodiment of the invention, the various programs independently utilize system resources of server 16. In some cases, an operating system, such as windows NT or UNIX may support multiple users on a single system. Alternatively or additionally, server 16 may include software which captures operating system requests from the different programs 30 and then handles the requests in a manner which is transparent to the programs. One example of such a resource is cursor position. Another example is copy and paste commands in which a separate cut-buffer is preferably maintained for each program and/or user, so that copy and paste commands on different programs do not interact.

In a preferred embodiment of the invention, an overlay generator 40 is used to add an overlay to virtual display 32. Such an overlay may be used, for example, to add a cursor. Alternatively or additionally, the overlay is used to add user specific information which is not known by the program but which is tracked by server 16, for example connection time.

In a preferred embodiment of the invention, overlay generator 40 and/or other elements of server 16 may be used to add an overlay to a TV program channel, especially a compressed channel. Such an overlay may include WWW pages, program outputs, links and/or dynamic and/or static displays.

In a preferred embodiment of the invention, each program 30 has assigned to it also a virtual audio card, for outputting sounds generated by program 30. Alternatively or additionally, each program 30 has assigned to it a virtual video card. Preferably, the video output of the card are displayed in a window on the display. Preferably, the inputs and/or outputs utilized by program 30 are also managed as virtual devices, for example a virtual mouse and/or keyboard. In a preferred embodiment of the invention, additional virtual input and/or output devices may be associated with each program. One example of such a device is a modem, for a user downloading information to program 30. Another example is a voice input channel, preferably with speech recognition. Preferably, the virtual devices are assigned from a pool, on a demand basis. Alternatively or additionally, a single virtual device is used for a plurality of programs and the device driver is operative to individually service a plurality of programs so that there is no undesired interaction between the programs.

In a preferred embodiment of the invention, a portion of virtual display 32 may be viewed on server 16, for monitoring purposes. Alternatively or additionally, such a portion may be viewed from a remote location, preferably, by a remote system manager. Alternatively or additionally, a plurality of displays for individual programs may be displayed simultaneously, preferably with each one being reduced in size and with a plurality of program windows being displayed on a single monitor. In a preferred embodiment of the invention, server 16 is operative to record audio, displays and/or inputs for a particular program or for a plurality of programs. Such recording is preferably initiated by a system manager or by a user of the program. Preferably, an indication of such initiation is made directly to server 16 and bypassing program 30.

In a preferred embodiment of the invention, server 16 is connected to a printer and/or video or audio recording devices, such as a DVD. Preferably, a user can print text or graphics and/or record a multi-media segment using these devices and the hard copy is preferably mailed and/or otherwise delivered to the user.

In some preferred embodiments of the invention, mixing box 38 is used to connect to different types of networks, in addition to or instead of a cable network. In one preferred embodiment of the invention, mixing box 38 is used to connect to a telephone line. Preferably, a single data channel is transmitted over a plurality of lines. Alternatively, compression algorithms adapted for telephone lines may be used. Alternatively or additionally, an ISDN line may be used.

Preferably, set-top box 14 is modified so that it can also connect to the same type of network that mixing box 38 is connected to. Alternatively an additional adapter box is used to adapt from one network to the other.

In a preferred embodiment of the invention, a computer is directly connected to the network instead of through a set-top box. In one preferred embodiment of the invention, a LAN or a WAN is used to connect server 16 and the computer. Preferably, the compressed video data is transmitted as data packets over the network.

Figure 3:
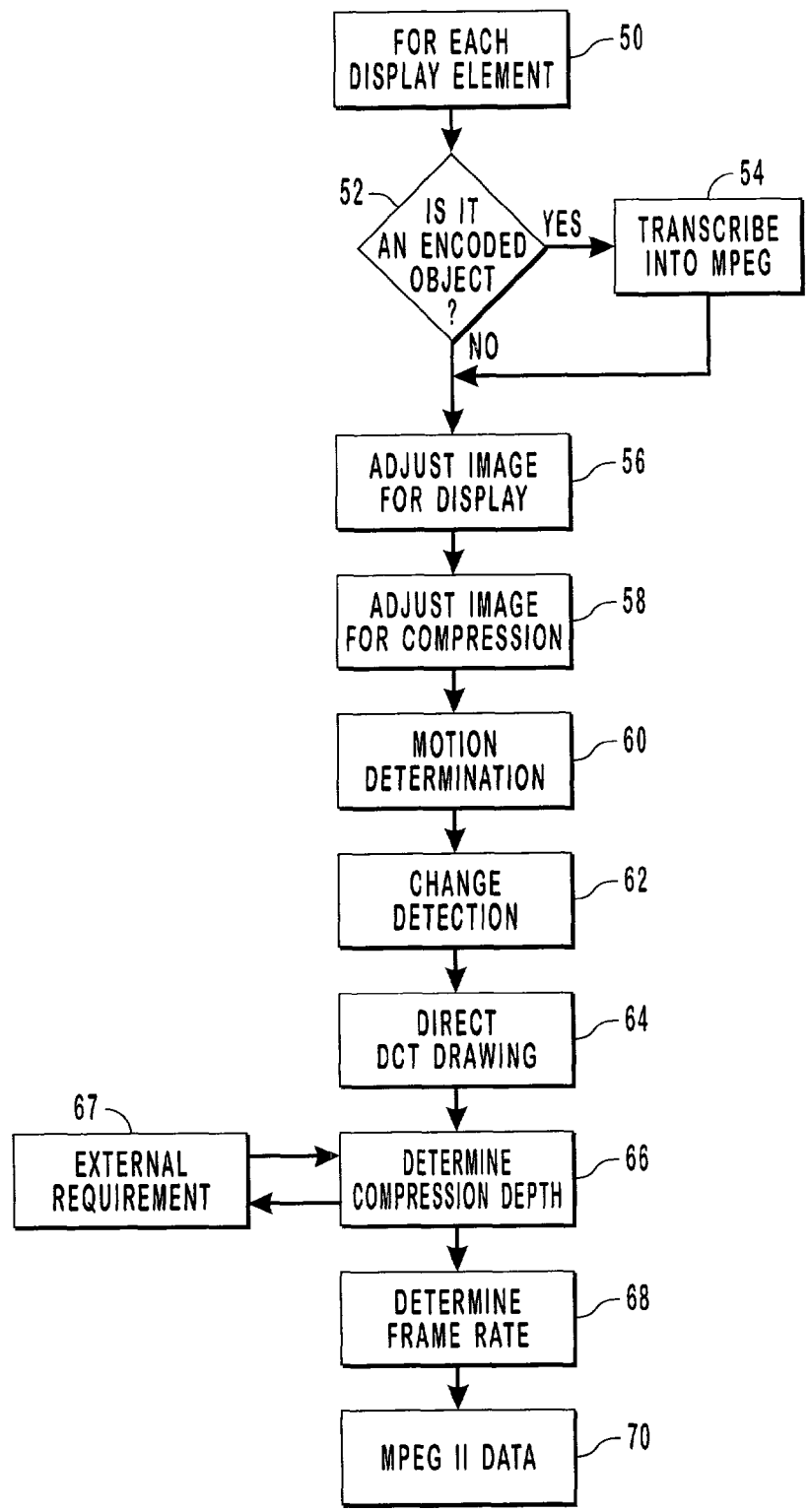
FIG. 3 is a flowchart for a method of generating a compressed video stream, in accordance with a preferred embodiment of the invention.

FIG. 3 is a flowchart for a method of generating a compressed video stream, in accordance with a preferred embodiment of the invention. This flowchart is preferably repeated (50) for each display element, where a display element is a graphical primitive or object which is drawn by program 30 or by the operating system. Alternatively, an entire display is built and then compressed. Alternatively the display is processed on a block-by block basis and each display element is a block or a portion thereof. Preferably, the block size is 8×8, 16×16 pixels or another multiple of the MPEG block size. It should be appreciated that different parts of the flowchart may be applied with a different granularity. For example, some of the flowchart may be performed on a frame-by-frame basis, while other parts may be performed on a block-by- block, super-block-by-super-block or element-by-element basis.

In a preferred embodiment of the invention, all the steps of the flowchart are performed. However, in other preferred embodiments of the invention, fewer than all the steps may be performed, for example even only a single step may be performed.

If the display element is an encoded object (52), for example compressed video or audio, the compressed data is preferably transcribed (54) into the MPEG stream, rather than decompressing and re-compressing it. When the object is displayed on the virtual display using a WWW browser, a special viewer is provided for this type of multimedia object so that the data is transcribed to the MPEG stream instead of being decompressed, "displayed" and recompressed. When the object is displayed using the operating system of server 16, a similar transcription is performed. In a preferred embodiment of the invention, the resolution of the transcribed stream may also be controlled, for example, by re-quantizing DCT coefficients in MPEG and JPEG data. Preferably, the resolution is controlled to match bandwidth restrictions and/or quality restrictions.

Different transcriptions are preferably used for different types of compression, since the type and amount of reusable data is dependent on the type of compression. For JPEG compressed images, the DCT coefficients may be reused. Once the image is transmitted once, it does not change, so only motion vectors are required to describe it in future frames. MPEG compressed streams may be simply copied. Some types of video compression do not use the DCT transform but do contain motion estimation parameters which are reusable by the MPEG compression process. The MPEG standard supports several types of audio, which types can be simply copied from the input to the MPEG stream. Alternatively or additionally, to compressed streams, other types of encoded data may be transcribed, for example, the encoded data may contain display commands, which may be directly converted to compressed video, without rendering the commands, as described herein.

In a preferred embodiment of the invention, the display is adjusted for the TV display (56) and/or to make the compression more efficient (58). These two types of adjustments may interact, however, for simplicity of description they are described separately. A TV display has several characteristics which not as good as and/or different from a computer display, including, resolution, frame rate, CRT scanning path, flicker problems, aspect ratio, viewing distance color resolution and interlacing. The lower resolution typically requires increasing a font size used or using a more-readable font than required for a computer display. Flicker problems are typically caused by thin horizontal lines, which are preferably replaced by thick horizontal lines. Alternatively or additionally, low pass filtering is applied to the image, at least in the vertical dimension. In a preferred embodiment of the invention, such a low pass filtering is applied by reducing the quantization of the vertical frequency coefficients, after the image is transformed, at least of the high frequencies. It should be appreciated that filtering in a DCT space is not multiplication. However, such filtering may be approximated by multiplication. Preferably however, a look-up table is used to perform filtering. Most preferably, the filtering is performed during the quantization, preferably embodied in the quantization look-up table.

The aspect ratio difference is preferably solved by pixel interpolation. The increased viewing distance for TV is preferably adjusted for by increasing the font size. The color resolution of a TV per-se may be the same as a computer display. However, both the MPEG II standard and most TV transmission standards utilize a lower spatial resolution for color. Preferably, display elements which depend on color resolution for their discernability are enlarged and/or the colors used changed. In a preferred embodiment of the invention, the display is modified so that it is suitable for vision-challenged individuals. Preferably, such modification is personalized to the visual abilities of a particular user, which abilities may be associated with the user or which abilities may be entered by the user.

There is preferably a two-way interaction between computer generated displays and MPEG compression. The MPEG compression affects how the display will look and the content of the display affects the efficiency and speed of the MPEG compression. First, some types of displays elements require many more bits to compress than other types. Second, some types of display elements are degraded to a greater amount than other elements, by a same amount of compression. Third, some types of display elements are easier/faster to compress than others. In a preferred embodiment of the invention, display elements are modified so that they look better, are easier to use and/or faster to compress than the original display elements. Some examples include, manipulating colors so that the color components can be compressed to a greater degree; moving elements, such as bullets, so that they do not straddle block boundaries; using fonts with fewer high-frequency components; reducing flashing rates of colors and cursors and/or synchronizing them with each other and/or other display changes; reducing animation rates of animated objects; low-pass filtering, to reduce display resolution; and/or reducing scrolling resolution, for example to be limited to blocks and/or super-blocks, so that motion estimation only involves moving of whole blocks. In a preferred embodiment of the invention, a scrolling below a certain resolution is not shown and/or is rounded up to a nearest number of pixels divisible by 8.

In a preferred embodiment of the invention, color manipulation and/or other types of image adjustment, except possibly for aspect ratio correction, are not performed on multimedia segments which are downloaded from the Internet.

Preferably, some or all of these adjustments are performed by changing settings of program 30 and/or of the operating system. However, in some cases, these adjustments may be simpler to perform as a post-processing step during the display compression (58).

In a preferred embodiment of the invention, motion estimation is performed utilizing a knowledge of the structure and/or build-up of the display, instead of or in addition to analyzing consecutive frames of the display (60). Preferably, this knowledge is gleaned from the graphics commands generated by program 30. Alternatively or additionally, especially in an Internet browsing embodiment, this knowledge is gleaned from HTML, Java or java script commands downloaded from the Internet. Similarly, changes in a display which are described below as being performed by modifying display commands, may also be performed by modifying HTML files, possibly in a pre-processor to the browser.

In a preferred embodiment of the invention, special note is taken of scrolling commands, which define a motion vector for portions of the display. Text based displays usually involve a significant amount of scrolling. Even graphics based displays may contain a significant amount of scrolling, since the display is often only a window into a large underlying data space. Preferably, very large motion vectors are allowed, for example as long as 200 pixel long. Typically, the vectors will comprise integer numbers of pixels in the X and Y axis components. It should be appreciated that there are several types of "scrolling" type commands, including:
 (a) scrolling of a portion of the display when a user enters text in a word processor;
 (b) scrolling of a scrollable display element;
 (c) moving a window and/or a display element on the display;
 (d) horizontal and/or vertical motions of blocks of image information; and/or
 (e) scrolling of an entire horizontal or vertical swath of a screen or of the entire screen.

In a particular example, when a WWW page is being downloaded, portions of the display are moved around as new images and their sizes are downloaded. In a preferred embodiment of the invention, portions of the display are moved using scrolling-type commands, so that only motion vectors need to be transmitted by the compression mechanism. In a preferred embodiment of the invention, some of the data may be scrolled to or from outside of the viewing area. Preferably, scrolled out data may be retained by the MPEG decompressor, for use when such data "moves" back into the displayed area.

In addition, determining motion vectors by image analysis can generally be performed more efficiently in most computer generated displays than in acquired image streams. When a section of a computer generated display moves, it is usually copied, so a perfect correspondence between the source and the destination can be expected and searched for. In a preferred embodiment of the invention, the computer program is limited to movements of units of 8 or some other number, preferably integer, so that motion estimation is faster and/or does not required pixel interpolation. Alternatively or additionally, the virtual device driver translates scrolling commands into units which are divisible by 8.

In a preferred embodiment of the invention, changes are detected by focusing on pixels which were rendered and or on areas on which display commands operated (62).

In a preferred embodiment of the invention, graphical elements are drawn directly (64) into a transform space, such as a DCT space or a wavelet transform space, instead of first being drawn and then transformed. Some graphical elements can be reused (their DCT coefficients reused), for example, window borders, standard buttons, bullets, letters, icons, menus and/or some images. Graphical elements can be reused between downloaded web pages, between programs, between users and/or between different frames of the same program. Preferably, a cache of DCT transformed web pages is stored in addition to or instead of a cache of HTML files. In addition, basic graphical elements can be drawn directly as DCT coefficients, for example, pixels, line, combinations of primitives and transformed primitives (zoom, rotate).

In some cases there is a simple analytic formula connecting the original DCT coefficients and the transformed ones, for example in rotations, zoom by an integer number and decimation by an integer factor. When two primitives are both drawn in the same block, the coefficients are added. In a preferred embodiment of the invention, the coefficients are linearly added. Alternatively or additionally, the adding takes into account the quantization and is preferably performed using a look-up table. In a preferred embodiment of the invention, when the primitives overlap, they are split into non-overlapping portions and overlapping portions. The non-overlapping portions are simply drawn. The drawing of the overlapping portions depends on the type of interaction (such as bitblt command) between the two primitives. In some cases, a sum or an average of their DCT coefficients generates a good graphical representation.

Alternatively or additionally, other processing may be performed on DCT coefficients, prior to them being drawn into said DCT space, for example, rotation, quantization, smoothing and/or thresholding.

In a preferred embodiment of the invention, the DCT coefficients for some primitives are calculated on-the-fly, using analytical formulae. In one example, a single pixel, DCT coefficients for a pixel at a location $(x0, y0)$ in a compression block yields the following DCT coefficient value for coefficients $(k, i)$: $\cos(2\pi 0^*(k+0.5)/8)\cos(2\pi y0(i+0.5)/8)$. A line is preferably drawn as a series of pixels, each of which may be "rendered" using the above formula. Preferably, a line is first divided into line segments, each of which is included in a single compression block.

Alternatively or additionally, the DCT coefficients for basic objects are stored in tables, corresponding to positions of the object within the block. Preferably, display elements are modified so that they match a table entry and/or an analytic transformation is used to modify them. It should be appreciated that in some preferred embodiments of the invention, standard display portions, such as borders and menus change rarely on the display, so that they are only infrequently compressed and/or retrieved from an appropriate lookup table.

In a preferred embodiment of the invention, display elements are moved so that they do not straddle compression blocks. Alternatively, or when the element is larger than a block, the element may be split between blocks. Alternatively or additionally, a look-up table stores coefficients for a 16×16 block. Alternatively or additionally, the 16×16 coefficients are calculated from 8×8 coefficients, by interpolation.

It should be appreciated that methods for direct drawing of elements into the DCT space and/or other transform spaces, for other compression methods, are generally suitable for parallel implementation, as the different coefficients can be set independent of each other.

Up to this stage, the transformation, as described, is generally loss-less, although lossy transformation (compression) methods and/or thresholds can be applied even at these early stages. Information compression is preferably achieved by quantization of the DCT coefficients. It should be appreciated that in many implementation, the transform step is integrated with the quantization step, so there may be no separating line between transformation and compression. In a preferred embodiment of the invention, a compression depth which requires lossy compression is determined (66). Preferably, the depth of compression is determined responsive to external requirements (67), such as available bandwidth or others, described below. Alternatively or additionally, the amount of lossy compression desired for the current display is outputted to an external environment, preferably as part of a negotiation for bandwidth. The desired compression depth may be dependent on the type of data displayed or on other parameters, described below.

Additionally or alternatively to determining the compression depth, the frame rate of the display is reduced to below a video rate (68).

In a preferred embodiment of the invention, a plurality of modifiable parameters are available for trading off image quality and bandwidth. Each of these parameters may have a range in which the image quality is minimally degraded and a range where the quality is significantly degraded. In addition, different parameters may have different effects for different images types. For example, the frame rate is not very important when viewing text, but it is very important when playing a computer game. The parameters which can be modified preferably include one or more of:

(a) frame rate;
(b) DCT coefficient sampling resolution;
(c) a motion estimation threshold, below which no motion is detected;
(d) a change estimation threshold;
(e) allowances for modifying the positions of objects, for more efficient compression;
(f) allowance for modifying the appearance of objects;
(g) color modifications;
(h) reduced resolution in imported multimedia objects, such as MPEG movies;
(i) accuracy of direct DCT drawing tables and transformations;
(j) different parameter values per portion of the display, per display element and/or graphical primitive; and/or
(k) a desired image quality.

In a preferred embodiment of the invention, different parameters have different levels of importance, depending, inter alia, on what is being viewed. Preferably, each program, TV set, user and/or combinations thereof are associated with a particular set of desired values for these parameters and their relative importance and/or minimal and/or maximal values. Preferably, these parameters are associated with a set-top box digital subscriber number.

Additionally or alternatively, different values of compression parameters may be defined for different parts of the display, for example, standard icons and menu bars may be compressed to a lower quality than unknown icons, since they are more easily recognized.

Additionally or alternatively, the compression and/or bandwidth requirements are dependent on a prediction of the future frames. In one example, if a JPEG image is being downloaded and displayed, less bandwidth will be required for a particular display portion than if an MPEG video is being downloaded and displayed.

In a preferred embodiment of the invention, the compression is performed using a variable-bit rate, while requiring a constant quality threshold. The quality threshold may be changed as a function of available bandwidth, as described above.

In a preferred embodiment of the invention, the compressed video signal may include two types of compressed data. For example, an MPEG portion and an AVI portion. However, this may require additional capabilities for the set-top box.

In a preferred embodiment of the invention, programming of the set-top box is updated from server 16. This updating is preferably performed while the TV is not in use. Preferably, the selection of the compression parameters is a function of the TV type (standard, digital or HDTV), its size and/or the capabilities of the set-top box with regard to its speed, programmability and memory. Preferably, more complex and/or efficient compression schemes are used for more sophisticated set-top boxes.

Although the above embodiments have been described generally with reference to MPEG compression, it should be appreciated that they may be applied for many types of compression practiced today, especially transform-quantize type compression methods. Non MPEG compression types are also important when the display is not a two-dimensional raster display, for example, when the display is a three-dimensional raster display.

In a preferred embodiment of the invention, the method explained with reference to FIG. 3 is performed responsive to change events, which indicate to the image compressor that a change has occurred in an image of a display channel. Step 62, "change detection" is preferably utilized to determine if the change warrants an update to the image, based on, for example, the available bandwidth, available computing power and/or type of user connection. In a preferred embodiment of the invention, only the changed portion of the image is processed and a new output frame is assembled from the newly compressed image portions and, possibly, existing, unchanged compressed image portions. In a preferred embodiment of the invention, three kinds of frames may be generated:

(a) "I" frames, which include a complete image;
(b) "P" frames, which define changes over a previous image; and/or
(c) "N" frames which indicate that no changes are to be made.

As can be appreciated, it is desirable to minimize usage of computational resources as well as bandwidth resources. On the other hand, it is desirable to provide a fast feedback to at least some user interactions. Alternatively or additionally, it is desirable to maintain a fixed frame rate at the display unit. Alternatively or additionally, the MPEG decompressor may be modified to allow variable frame-rates.

In a preferred embodiment of the invention, the compression-display process is asynchronous, so that each part of the pipeline, e.g., image generation, compression, transmission and decompression-display, may be separately optimized and/or otherwise controlled.

In a preferred embodiment of the invention, the decompression-display is maintained at a fixed frame rate by buffering "I" and "P" type frames with "N" type frames, to maintain a desired frame rate. In a preferred embodiment of the invention, the type frames are evenly distributed in the video stream. In a preferred embodiment of the invention, the distribution of "N" frames is used to effect a statistical multiplexing of "new" frames between a plurality of channels.

In a preferred embodiment of the invention, the compression is asynchronic, generating new compressed data only when a change has occurred in the image. This allows the image generating program to run at screen-update rates, possibly unrelated to the compression frame rate. Alternatively or additionally, at least some of the image generation-display process is synchronized, for example, by buffering the communications between differently synchronized portions of the image generation, compression and display system. In one example, change events may be queued and then processed (to effect image compression) at the desired frame rate. Alternatively or additionally, the compression and/or transmission portions may control the image generating program, for example to slow down and/or provide only certain types of output. In one example, the operating system may reduce the CPU slicewidth of a program which is generating output too fast.

Alternatively or additionally, change events may be asynchronously queued and/or delayed. In a preferred embodiment of the invention, such delaying is performed which there are momentary limitations on computing power and/or on transmission bandwidth. In a preferred embodiment of the invention, two or more change events may be combined so that only a single portion of an image is compressed. In one example, two scroll commands can be combined into a single "scroll" event. Alternatively or additionally, some types of change events may be discarded, for example based on a threshold and/or on an image quality requirement.

Alternatively or additionally, when an image portion is compressed, generation of frames may be delayed, responsive to limitations in computing power and/or bandwidth. In some cases, some image portions may be delayed long enough that a newer version of the portion overrides them. Alternatively or additionally, such delays and queuing in compression and frame generation are responsive to a desirable compression-output frame rate.

In a preferred embodiment of the invention, motion and/or change information is provided as "side" information to the compression process. Such side information may be generated by the program, by analyzing the commands sent to the virtual display driver and/or by analyzing the results of the display commands.

In a preferred embodiment of the invention, different compression levels and/or other parameters are organized in sets. A particular set is preferably selected based on the available bandwidth, computing resources and/or other factors which are described herein as affecting the compression.

In a preferred embodiment of the invention, even when the frame rate is low, certain portions of the display may be updated at a faster rate, for example, to provide feedback for a mouse action, mouse motion and/or keyboard entry. This may be achieved by sending MPEG frames in which the only blocks changed are those for which feedback is required. In a preferred embodiment of the invention, the user input channel is fast and asynchronic, so that it is not delayed by frame-rate considerations.

In a preferred embodiment of the invention, different change events have different priorities and may therefore "pass" queued and/or delayed events, in the image generation display pipeline. For example a change event related to a response to a user input, e.g. cursor motion, may have a higher priority that a system status display. More than two priority levels may be defined. In a preferred embodiment of the invention, each priority level may have associated therewith a "frame rate" at which change events and/or other processing associated with the event are handled. Alternatively or additionally, each priority level may have other information associated therewith, for example, allowed delay time and/or error correction level.

In a preferred embodiment of the invention, blocks associated with high priority levels of change events may be automatically determined even without an indication from the program. In one example, such changes are detected by capturing "windows" commands, such as cursor movement and shading of menus.

Figure 4:
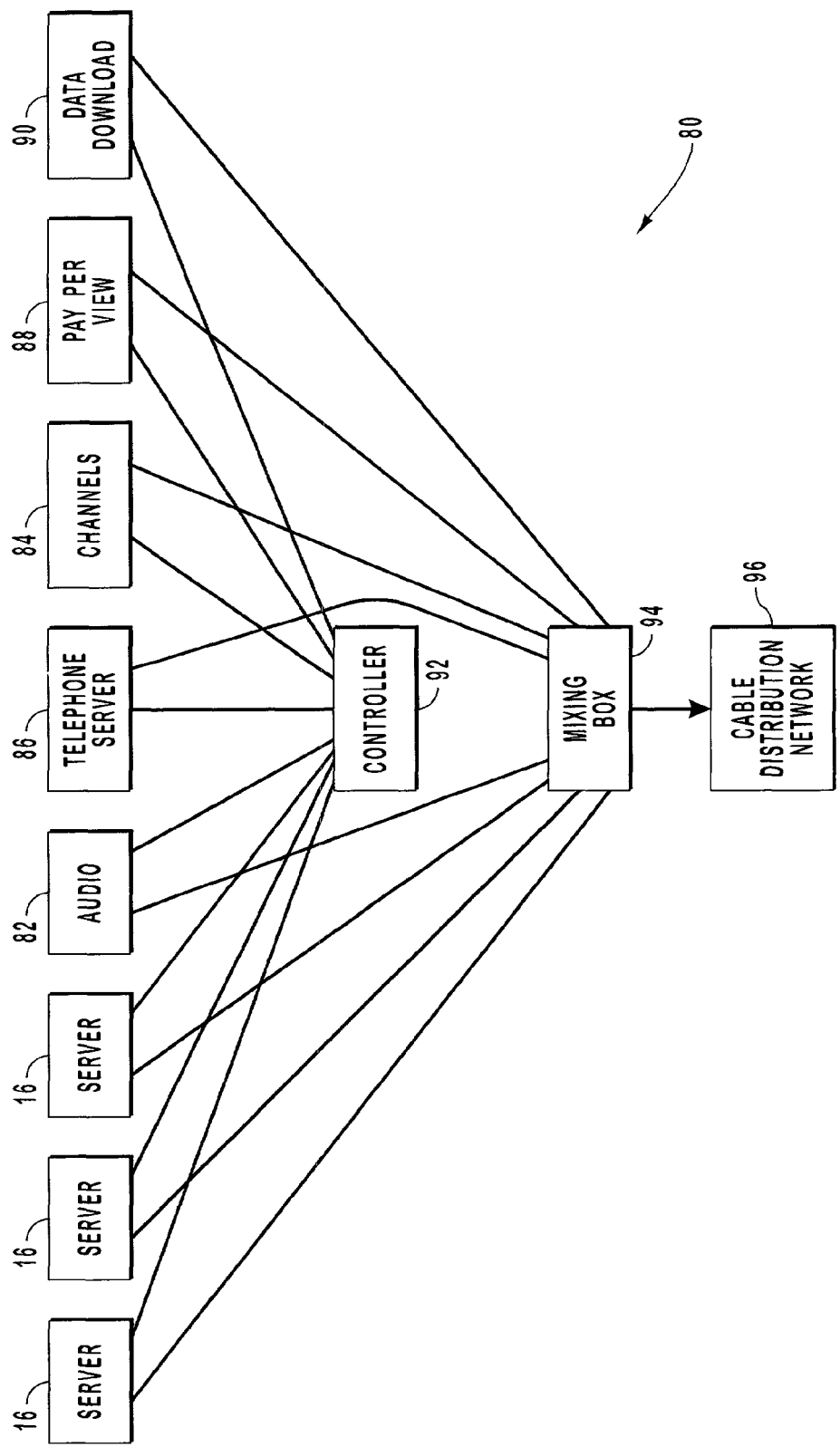
FIG. 4 is a schematic diagram of a cable operator configuration, in accordance with a preferred embodiment of the invention.

FIG. 4 is a schematic diagram of a cable operator configuration 80, in accordance with a preferred embodiment of the invention. In a typical cable distribution network, bandwidth must be allocated between many services, including one or more of a plurality of viewing channels 84, a plurality of pay-per-view movies 88, data downloading from remote sources 90, telephone and video-conferencing services 86 and audio channels 82. Additionally, not shown are bandwidth requirements for data traveling from subscribers to cable operator 80. In a preferred embodiment of the invention, this last bandwidth is also shared with one or more servers 16, which provide remote computer access to subscribers. Preferably, a controller 92 assigns bandwidth portions to different ones of the services. The video and/or data streams from the services are preferably mixed using a mixing box 94 and distributed using a cable distribution network 96. Although FIG. 4 generally describes a centralized system, in some preferred embodiments of the invention, the configuration is distributed. For example, a plurality of servers may be provided with each one serving a small locality. At need, a local server may be utilized to server a more remote location. In a preferred embodiment of the invention, the cable operator has a centralized connection to the Internet and Internet data is transmitted using a cable data connection from the Internet connection to a server 16 which requires it. Alternatively, a plurality of such Internet connections may be provided.

In a preferred embodiment of the invention, a certain amount of bandwidth is assigned by the cable provider for use of server 16. Preferably, controller 92 trades-off between the various services and/or between the bandwidth requirements of different servers. Preferably, the available bandwidth for each client/server channel is constantly changing to reflect the instantaneous availability of bandwidth and/or the needs of the various services. In a preferred embodiment of the invention, a statistical multiplexing of bandwidth is performed between the channels so that the average available bandwidth for each channel is as desired. This allows a momentary higher bandwidth for a particular channel, if required. Alternatively or additionally, this allows asynchronic transmission of the different channels.

In a preferred embodiment of the invention, the relative bandwidths assignments for each user of servers 16 are adjusted. In accordance with one preferred embodiment of the invention, the bandwidth is assigned between users so that a same compression depth is achieved for each one. Alternatively or additionally, the bandwidth is divided up so that a constant quality measure is achieved for each user. The quality for each user may be defined using quality measures well known in the art. Alternatively or additionally, the quality measures may be dependent on the compression parameters sets described above, which define which compression parameters may be degraded, to what extent and/or what consequence is allowable. Alternatively or additionally, bandwidth is divided up so that a moving-window average of bandwidth is the same for each user.

In a preferred embodiment of the invention, some users receive more bandwidth than other users and/or are more likely to retain their bandwidth in case of bandwidth shortage. Preferably, users can order a certain minimal and/or average bandwidth ahead of time. Alternatively, a user can require a certain minimal and/or average frame rate and/or a maximal and/or average image degradation.

It should be appreciated that different computer displays require different amounts of bandwidth, for example, static text displays require less bandwidth than graphical animation. Preferably, an average bandwidth is achieved by statistically assigning more bandwidth for complex displays and less bandwidth for simple displays.

Additionally or alternatively, the average bandwidth requirements for particular programs and/or WWW sites may be stored so that the required bandwidth may be better estimated.

Alternatively or additionally, programs which generate displays may be slowed down so that the bandwidth required is lower. In one example, downloading of information is slowed so that it is displayed slower. In another example, a computer game is slowed down and/or its frame refresh rate lowered and/or its image definition reduced so that its bandwidth requirements are lower. One way of reducing image definition is by providing a virtual display with a reduced resolution and/or drawing with a reduced resolution.

In a preferred embodiment of the invention, TV programming, especially video-on-demand programming, but possibly also other types of TV channels, include hints for statistical multiplexing. These hints may include an indication of the content of a frame or frames of video. Alternatively or additionally, it may indicate a required bandwidth. Alternatively or additionally, it may indicate an allowed quality reduction. Thus, when two such channels are statistically multiplexed, for example, as performed in an "iMedia" system, the multiplexing can take into account the content of the channels and not only their statistical properties. Such hints may be transmitted on a data channel. Alternatively or additionally, these hints may be provided with a stored TV programming sequence. Alternatively or additionally, the hints may comprise hints for advertisement insertion, for example, an indication of a portion of a frame which may be replaced by an advertisement. These display portions may be replaced with compressed video advertisements, without decompressing the source channel, for example by replacing compressed image blocks.

It should be appreciated that by controlling the compression and/or the programs and/or the downloading of data, very fine control over bandwidth, image quality and/or trade-off between them may be achieved, with a fast response time.

In a preferred embodiment of the invention, subscribers are charged for utilizing servers 16 and the bandwidth used on cable distribution network 96. Such billing may be a function of several charge methods, including one or more of the following and/or combinations thereof:

(a) per hour usage of server 16 and/or network 96 and/or Internet connection;
(b) per CPU second of server 16;
(c) per second of time for MPEG compression;
(d) flat fee;
(e) per MPEG byte transmitted to user;
(f) per data byte downloaded from the Internet;
(g) per storage at server 16;
(h) different rates for different programs used, per usage time or per usage time and/or count of these programs;
(i) per hardcopy generated, possibly including cost of mailing and/or messenger to the user;
(j) per data transmitted from the user to server 16;
(k) advertisement level, where cable TV charges may be lower if a higher advertisement level is allowed; and
(l) incentive payments, for example based on the actual advertisements viewed.

In addition, the actual rate may be a function of one or more of:

(a) the quality of data transmitted and/or the amount of modification of the data;
(b) limitations imposed by a user on the bandwidth or the quality;
(c) relative availability of the bandwidth; and/or
(d) variations in actual bandwidth.

In a preferred embodiment of the invention, the accounting for cable services and server 16 services are combined. In a preferred embodiment of the invention, the usage of specific programs is tracked in order to pay royalties to the program provider and/or copyright owner.

In a preferred embodiment of the invention, advertisements are mixed into the compressed video stream.

In a preferred embodiment of the invention, advertisements are added to the compressed video stream which is sent to the client. The use of advertisements may offset some of the cost of providing the service and/or may provide an additional income source for the cable provider. In a preferred embodiment of the invention, advertisements are added to the video stream in a manner which will minimally affect using program 30 and/or browsing the Internet.

In one preferred embodiment of the invention, advertisements are displayed while waiting for an image or file to load and/or while a program is busy calculating. Alternatively or additionally, advertisements are displayed when server 16 is too busy to run program 30.

Alternatively or additionally, advertisements are added to the background of a display, for example underlying text. The background may be automatically detected either by its color or by the drawing command used to draw it, typically, a large single color rectangle.

Alternatively or additionally, advertisements are placed in unused portions of the screen, for example, large blank spaces. Preferably, the advertisements are moved and/or resized and/or clipped to reflect changes in the usage of the screen. In one preferred embodiment of the invention, an advertisement is minimized to an icon, which a user can open at will. Opening such an icon may create an overlay an underlay and/or other changes in the display, in addition to or instead of opening a window with the advertisement.

Alternatively or additionally, advertisements are non-rectangular. Preferably, an advertisement is selected to fit the size, shape and/or aspect ratio of an available area. Alternatively to selecting the advertisement, an existing advertisement may be modified so that it meets time or space constraints. Preferably, advertisements are inserted into areas of the display into which images and/or video is being downloaded from the Internet.

Alternatively or additionally, an advertisement may be used to replace screen elements which are drawn by the operating system of server 16 or by a standard program thereon. For example, an advertisement (static or live) may be used to replace the cursor, an icon and/or a per-program defined section of the screen.

In a preferred embodiment of the invention, a program and/or a WWW browsing session may be modified using a suite of advertisements. In an example of a soft-drink company, the cursor is replaced with a bottle icon, loading images are replaced (during loading) with well known advertisements and system messages are replaced with messages which include a soft-drink related content.

In a preferred embodiment of the invention advertisements and/or programs have associated with them scripts which define where advertisements can be inserted. The scripts are preferably written in an interpreted language, such as Visual Basic.

In a preferred embodiment of the invention, the advertisements are inserted in a different sensing modality from what is used by a user. For example, if the user is using a visual display, audio advertisements may be used, and vice versa. In particular, when a program is generating (only) a sound track, a visual advertisement may be displayed.

In a preferred embodiment of the invention, server 16 automatically detects the activation of a screen-saver mode and replaces the screen saver or a portion of it with an advertisement. Alternatively or additionally, an advertisement may be displayed and/or sounded if the program is not in use or no user input is detected for a certain amount of time.

In a preferred embodiment of the invention, an artificial pause in the usage of program 30 is inserted (for the advertiser) and an advertisement is displayed on all or part of the display. Preferably, certain times in the execution of program 30 are defined as being less amenable to being interrupted. In one example, advertisement breaks are inserted if a user stops typing for a certain amount of time, after he types a period or after he performs a save operation (in a word processor). In another example, advertisement breaks are added to a browsing section when a new page is entered and a considerable amount of data is to be unloaded.

In a preferred embodiment of the invention, an advertisement may be stopped or artificially shortened, when a user starts entering input or when an image download is complete. Preferably, preferred ending points and/or sections to be skipped are defined for the advertisement, so that the break is clean.

In a preferred embodiment of the invention, the expected duration of time during which an advertisement can be displayed and/or the size of area and changes in the size may be determined responsive to the activities which are being performed by the user. In one example, the time to download an image download can be estimated. This estimation may be used to select an advertisement which is just the right length or to select a plurality of consecutive advertisements. If the download rate changes, the advertisement may be shortened, lengthened or replaced, accordingly.

In a preferred embodiment of the invention, the user can indicate to server 16, preferably bypassing program 30, annotations for particular advertisements. In particular, a user can indicate to the server an advertisement which he wishes to view again, an advertisement which he find offensive and or to indicate a general level of advertisement content which is acceptable (or example for parental control purposes). Additionally or alternatively, a user can provide feedback to an advertisement. In one example, a user can browse a WWW site associate with the advertisement. In another example, a user can place a telephone call or a video conference call, through the cable network to a location associated with the advertisement.

Various types of advertisements may be used, including:
(a) static images;
(b) animation by a slowly changing image sequence;
(c) animation using a graphical program run at the server;
(d) silent video;
(e) audio; and
(f) video with sounds.
In a preferred embodiment of the invention, the advertisement includes a pre-defined frame rate, which may change over the duration of the advertisement.

In a preferred embodiment of the invention, the advertisements are precompressed. Alternatively or additionally, the advertisements are DCT transformed and/or motion compensated, but not quantized. Preferably, the quantization is determined in the fly, as part of the bandwidth considerations. Alternatively or additionally, the frame rate and/or size and/or shape are determined on the fly. In a preferred embodiment of the invention, the advertisement has associated with it "bandwidth suggestions", which are certain sets of compression parameters which define a local optimum in the trade-off of bandwidth and viewing quality. Such definitions may be per portion of the advertisement.

It should be appreciated that the bandwidth which is devoted for the advertisement is not generally of interest to a user. In a preferred embodiment of the invention, the above described bandwidth optimizations and trade-offs are performed independently of any advertisement content. Preferably, portions of the image in which an advertisement will be placed are treated as portions which do not need to be transmitted.

In a preferred embodiment of the invention, the advertisement is purposely selected, preferably by server 16. Alternatively or additionally to a selection responsive to bandwidth and time considerations, such selection may be responsive to one or more of:
(a) WWW page content;
(b) a particular program being executed by a user and/or a particular action therein;
(c) demographics and/or other information associated with a user;
(d) statistical definitions of exposure to the advertisements;
(e) a desired temporal and/or modal distribution of a particular advertisement or product;
(f) language; and/or
(g) local geographical considerations, for example, local advertising.

In a preferred embodiment of the invention, a certain exposure of a user to advertisements and/or advertisement display rate may be desired. Preferably, when the rate is lower than desired, advertisements are inserted more often and/or longer advertisements are used.

In a preferred embodiment of the invention, a downloaded WWW page includes an indication of what advertisements to insert and where. The advertisements themselves are preferably stored locally at server 16 or elsewhere at cable operator 80. In a preferred embodiment of the invention, programs run at server 16 also have advertisements associated therewith, for example with certain actions and/or forms. In a preferred embodiment of the invention, the advertisement indications refer to a product or a group of products to be advertised. Alternatively or additionally, the indications are associated with an advertisement distributor.

In a preferred embodiment of the invention, server 16 downloads a files which contains up-to-date associations between advertisement indications and advertisements. In a preferred embodiment of the invention, the actual advertisements shown, their duration, their quality, an association with what the subscriber was doing at the time and/or a user response to an advertisement, are transmitted to an advertisement distributor so that royalty payments and/or payments to the cable company, can be determined.

In a preferred embodiment of the invention, advertisements are added to a WWW page by the portion of the browser which is supposed to display certain objects, such as AVI files. Preferably, the browser portion displays advertisements from a local storage while waiting for data to download so that the browser can display the real data.

In a preferred embodiment of the invention, other content, besides advertisement can be mixed with the display of program 30, using methods as described for advertisements. In a preferred embodiment of the invention, the content comprises TV channels, especially news and sports channels. This type of mixing is especially useful if the display of program 30 is relatively static.

In a preferred embodiment of the invention, advertisements are personalized, for content, at server 16 and/or the cable provider. In a preferred embodiment of the invention, such personalization may also be effected for non-Internet TV channels, for programs run at server 16 (such as a word processor) and/or for games. Thus, using any multi-media channel at a server 16 may require a user to view personalized advertisements. In another example, a software may require constant connection to the Internet in order to operate properly and/or in order to limit pirating of the program. Detection of the connection may be used for billing purposes and/or for sending personalized advertisements to be displayed by the program, even if the Internet connection does not utilize a configuration as described above.

In a preferred embodiment of the invention, each subscriber is assigned a private directory into which he can download information and store personal files. Preferably, the client is charged per space used. In a preferred embodiment of the invention, a user can download programs from the Internet or from home, into server 16 and run them at server 16. Preferably, such programs are run in a protected mode of the operating system so that they do not interfere with other programs. Alternatively or additionally, such programs are run on a separate server 16 from Web browsers.

In a preferred embodiment of the invention, a set-top box will only receive a channel if it matches a subscriber number of the set-top box. Alternatively or additionally, especially for channels viewable by multiple users, a channel may have associated therewith a plurality of subscribers numbers and/or a pattern which defines who may view the channel. In a preferred embodiment of the invention, the display is encrypted, such that only designated recipients may view it.

In a preferred embodiment of the invention, a password is hardwired into a set-top box. Alternatively or additionally, a password is entered by a user when logging unto server 16, for example for entering the Internet, at which point all transmission to the user may be encrypted responsive to the password. Alternatively or additionally, the password may be used for charging a user, so that a user may connect from different set-top boxes.

Alternatively or additionally, the system assigns a password to a user when he connects, based on the content the user is viewing. In one example a single password may be provided to a plurality of users viewing a same channel. Alternatively or additionally, each user and/or channel may be assigned a different password.

In a preferred embodiment of the invention, cable operator 80 comprises a plurality of computers, each suitable to run one or more programs 30. These computers may be organized in different servers 16. Alternatively or additionally, a plurality of computers may be included in a single server. In one preferred embodiment of the invention, different user's programs are run on different computers, depending on the relative load on the computers and/or the expected processing power required for compression and/or the expected processing power required by a particular program 30. In a preferred embodiment of the invention, a user can "rent" a particular computer for a certain amount of time to be wholly or partly dedicated to his needs. Alternatively or additionally, different programs 30 are run on different computers, for example, browsers are run on one computer and interactive games are run on a different computer.

In one preferred embodiment of the invention, a program is run on a first computer and the conversion of display command to compressed video is performed on a different computer. Preferably, this is achieved using a network windows operating system, such as X11, whereby the display commands for X11 are sent to the different computer to be converted there to an MPEG stream.

Alternatively or additionally, programs 30 may be moved between computers, preferably in a manner transparent to the end-user. In a preferred embodiment of the invention, each computer has a backup computer running the same programs, so that if the first computer crashes, the execution of the programs may be passed, preferably seamlessly, to the second computer. Alternatively or additionally, the computers share one or more storage disks. Alternatively or additionally, the distribution of programs 30 on the backup computers is different than on the live computers, so that the probability of a crash repeating itself and/or affecting the same programs 30, is reduced.

As can be appreciated, it is not generally desired that individual programs 30 are aware of other programs 30 being executed on the same server by a different subscriber. In addition, it is not usually desirable that a program 30 be aware of the transmission of the display by compressed video.

In an alternative preferred embodiment of the invention, program 30 is aware of the display and/or input situation. Preferably, such a program modifies its output and/or processing responsive to what is happening on the server and/or responsive to requests from the server. Preferably, program 30 is written for or adapted for a remote access configuration as described herein.

In a preferred embodiment of the invention, the execution of a program is affected by the display of the program results. In one example, when the display bandwidth is reduced, the rate at which displays are generated is also reduced. Alternatively, the display is slowed down. For example, if the display is paused, the program may also be paused. The opposite situation is also possible, if a program requires less display bandwidth, it may be allotted a higher share of the execution time. Alternatively to adjusting the execution rate to meet the display bandwidth requirements, the display bandwidth requirements may be adjusted to meet execution rate requirements. Alternatively or additionally, a program 30 may be slowed down if not enough CPU is available for it. Preferably, the relative ranking between programs with regard to display bandwidth and/or CPU availability is a property of the program which a subscriber can adjust and/or where he is billed for increased availability.

In a preferred embodiment of the invention, a user can perform remote cross-platform application execution, using methods described herein. A remote program is attached to a virtual display and input device, the display is provided to the user as described hereinabove and the user's input is provided to the remote location as described hereinabove. Preferably, the display for the remote program is shown as a window on the user's computer. Alternatively or additionally, the location of a pointing device, such as a mouse cursor, overlaid on the compressed video image is translated into a location relative to the remote program's window, prior to transmission thereto of the location.

In some preferred embodiments of the invention, two subscribers are allowed to interact via the interactions of their respective programs. Alternatively or additionally, a single subscriber may execute more than one program simultaneously on server 16, and be able to switch between them and/or pass data between them and/or allow them to otherwise interact, for example as provided in the Windows95 and/or Unix operating systems.

In one preferred embodiment of the invention, group games and/or group simulations are allowed in which a plurality of players interact. In one preferred embodiment of the invention, group games are run on a single computer which generates a plurality of display streams. Typically, a network connection will need to be simulated between such game programs. Alternatively, each program is run on a different computer at cable operator 80, which computers are connected by a LAN. In Internet group games, an Internet is preferably simulated between the games, instead of actually passing all the interactions through the Internet.

In a preferred embodiment of the invention, one subscriber can monitor the operation at one or more other subscribers, preferably by having their compressed video stream incorporated into his video stream. In one preferred embodiment of the invention, such monitoring is part of a help desk operation, so that a help desk operator can see exactly what a subscriber, with a problem, is seeing. Preferably, the helpdesk operator has the option of taking over the operation of a mouse and/or keyboard of program, overriding the subscriber. Alternatively or additionally, simultaneous input from both helpdesk operator and subscriber is allowed.

In a preferred embodiment of the invention, interactive tutoring may be performed. Since both the tutor's and the student's programs are running on the same computer or a networked computer, communication between them is simplified and response time may be shortened. Alternatively or additionally, a display of the user may be transmitted, in full size, in reduced size or clipped to the tutor, so he can monitor the student more closely. Preferably, the display is clipped relative to the mouse. Preferably, a plurality of clipped areas are transmitted. Alternatively or additionally to transmitting the student display, the tutor display may be transmitted. If a camera is available at the tutor and/or the student, a camera feed may also be transmitted between them.

In a preferred embodiment of the invention, a user can generate a plurality of display channels. The plurality of channels may be generated by multiple windows of a single program, by multiple programs or by defining different parts of a single display to be outputted in different channels. Such separate channels may overlap in the virtual display space. Preferably, the user switches between the viewing the multiple channels. Alternatively or additionally, the user views two or more channels simultaneously.

In a preferred embodiment of the invention, a user and/or the cable operator generate a channel to be viewed specifically by other users. Preferably, a plurality of users can view the channel simultaneously. Preferably, at most one of the other users, if any, may provide input to the channel. Alternatively, when more than one additional user views the channel and/or provides input, the program which generates the channel is duplicated for each channel. Preferably, the program comprises an unduplicated portion and a duplicated portion, so that a considerable amount of memory, CPU time and/or disk storage space may be saved. In a preferred embodiment of the invention, the program which generates the channel is not run and/or is paused while there are no subscribers connected to the channel Alternatively, the program is run but the display is not compressed and/or not transmitted over distribution network 96. Alternatively or additionally, the program is run at a reduced rate and/or the display is compressed to a higher degree. In a preferred embodiment of the invention, program 30 generates its display based on other data channels in the cable network system. For example, program 30 can generate a channel which comprises a portion of a sports channel and a portion of a news channel, text downloaded from a WWW site and a calculated graph.

In a preferred embodiment of the invention, program 30 generates stereo video streams. In a preferred embodiment of the invention, a compression method which allows the transmission of stereo pairs is used. Alternatively, two video streams are generated. Preferably, the two stereo streams are synchronized with respect to their frame rate, image quality and/or relative phase. Preferably, the set-top box is capable of decompressing two video streams simultaneously. In a preferred embodiment of the invention, where a TV that is capable of tuning to two or more channels at a time is utilized, such two or more channels are provided by the set-top box. Multiple channels may also be used to transmit news, such as sport news on a secondary channel and/or to transmit advertisements.

In addition, there are other circumstances in which two or more display channels, generated by a single user or generated by different users are synchronized, for example if two such channels are viewed by a single user.

In a preferred embodiment of the invention, a single packet may belong to two or more channels. In one example, a packet may include data for a frame of a "Windows 95", window, which data is useful for many channels. In another example, a plurality of data channels may utilize a same "I" frame but at least some different "P" frames. By allowing overlap between packets, it is possible to provide a large number of personalized WWW pages, using a limited bandwidth. One example of a situation in which such overlap is useful is in a satellite WWW broadcast system, in which a satellite communication system having a limited bandwidth is used to provide cable/internet/remote computing services to a plurality of subscribers. Another example is a microwave, coax or optical cable network, especially for a large area. Another example is a wireless transmission system, such as used for TV broadcasting.

In a preferred embodiment of the invention, a plurality of display channels are assigned for remote computer access. The assignment may be fixed or it may be variable, for example, depending on the availability of bandwidth and user requests for different types of multimedia channels. In a preferred embodiment of the invention, the assignment of WWW sites to channels is fixed. Alternatively or additionally, at least some of the assignments may change, for example by need (for example as is described below) or based on popular request and/or scheduling considerations.

It should be appreciated that there are many WWW sites that are view in substantially the same manner by a large number of people, for example, a news site. Such a site could be assigned a single channel. However, when a user follow a link from the site or scrolls the display, that user cannot force all the other users to scroll with him. In many cases however, only a small number of people will be scrolling at any given moment. In addition, the difference between what is being viewed by different subscribers may be limited to personalized advertisements and/or other personalizations of the WWW page. Thus, transmitting "P" frames containing only the changes from a globally available "I" frame require only a relatively small bandwidth. Once such a "P" frame is transmitted, a user can view only "N," frames until he makes his next request. In a preferred embodiment of the invention, when a user splits away from a group he is assigned a new channel number. After the change is transmitted to the user, the channel may start sending only "N" frames. Alternatively or additionally, the globally available channel transmits only "N" frames, with a periodic "I" frame. Alternatively or additionally, the user is switched to a standard channel which contains only "N" frame. In a preferred embodiment of the invention, depending on bandwidth limitations, a user may be limited in functionality, for example only to view WWW pages and/or follow links which have been selected by other subscribers. Alternatively or additionally, the system may delay in providing a channel with individualized "P" frames, until such a channel becomes available. In some cases, a user is presented with an hour-glass cursor, indicating that his request is queued. Alternatively or additionally, a message is displayed informing the user of the need to wait. Such a message may comprise "P" frames, for example from a standard channel. Alternatively or additionally, a link, a button and/or a menu item may be grayed out. Alternatively or additionally, a limitation on scrolling resolution may be used to reduce the number of required channels. Alternatively or additionally, the personalization of advertisements may be reduced.

Alternatively or additionally, to Internet channels, also TV channels can benefit from such sub-channeling. In one example, sub-channels may be used to provide advertising. Each locality may require a different advertisement program. In a preferred embodiment of the invention, the same channel includes several sets of "P" frames, which may refer to a same spatial potion of a display, for example to encode multiple possibilities for advertising for a same screen location. However, each end user will utilize only non-overlapping sets.

In a preferred embodiment of the invention, the listing of which channels to read data packets from and which of the data packets are relevant for a particular user, is provided in a data channel associated with one or more display channels. In a preferred embodiment of the invention, a plurality of WWW channels and/or variations on a single WWW site are provided in a single video channel, to reduce the need of physically switching between channels when reading video information.

In an alternative preferred embodiment of the invention, "P" and "I" frames can be computer files rather than compressed video information. In one example, an "I" file contains instructions on generating a basic display. A plurality of "P" files contain instructions on modifications of the display. An end user receives, for example on a data channel, a list of "I" and "P" to use to reconstruct a desired display channel. In one example, the computer files include HTML file sections. In another example, the files comprise display lists. In another example, the files include commands and/or definitions for a display generating language. For example, an "I" file may include calls to subroutines, which subroutines are defined differently in each "P" file. One example of a suitable language is JAVA.

In a preferred embodiment of the invention, the computer at server 16 is a powerful computer which can perform real-time services not practical at a home computer and/or requiring special software, for example speech recognition. In one preferred embodiment of the invention, input devices 20 comprises a microphone. A user provides voice commands to the microphone, which are analyzed by a powerful and/or dedicated computer at server 16. The results of the command are displayed on a TV set at the user, as described above.

It should be appreciated that by keeping expensive software at server 16, and on at a remote location which has a high speed connection to server 16, the owner of the software can be better protected against pirating of the software. The number of copies of the software is substantially reduced. In addition, users who would not buy the software can use it and pay royalties only for what they use, so another inducement to piracy is removed.

In a preferred embodiment of the invention, the above described configurations are used for dissemination of copyrighted material. In one aspect of this embodiment, each viewing/displaying/sounding of the material can be monitored and charged centrally by the cable operator, simplifying accounting processes. Additionally or alternatively, since the material is compressed before it is sent to the subscriber, its quality is not digital-perfect. Thus, pirated copies are of an inferior quality. Additionally or alternatively, each copy so transmitted can be marked with an individual copy number, preferably in a hidden location in the data. Thus, if the copyrighted material is copied, it is possible to trace the source of the copy.

It should be appreciated that some of the embodiments described herein may also be performed using other types of client/server communications, besides compressed video, for example using data communications to a set-top box which renders displays based on the data.

In a preferred embodiment of the invention, the browser executed at server 16 interacts with the compression process. In one example, server 16 may indicate to the browser a desired compression and/or quality level. Such an indication may cause the browser the perform display modifications, at the step of laying out of display elements. Alternatively or additionally, it may affect the type of graphical primitives generated by the browser. Alternatively or additionally, a configuration file, preferably read at start-up may define desired modifications in the browser output. Alternatively or additionally, the browser generates a special data output stream to server 16, in which the browser indicates display commands which may be superfluous or which require a large computational expenditure for compression and/or which increase compression bandwidth. Alternatively or additionally, the WWW page may include a plurality of display options for at least some of the objects to be displayed. Thus, if a resolution reduction is required, the reduction may be pre-planned in the WWW page definition, rather than imposed after the fact by the browser and/or server 16.

In a preferred embodiment of the invention, a WWW page designing program preferably also includes an ability to take into account limitations imposed by the compression and/or available bandwidth. In a preferred embodiment of the invention, an automatic WWW page generator, for example, one associated with a WWW server, receives an indication of compression and/or bandwidth limitations and therefore generates a WWW page which meets these limitations.

It will be appreciated that the above described methods of client-server communication and video compression may be varied in many ways, including, changing the order of steps, which steps are performed on-line or off-line, such as table preparation, and the exact implementation used, which can include various hardware and software combinations. The addition, a multiplicity of various features has been described. It should be appreciated that different features may be combined in different ways. In particular, not all the features are necessary in every preferred embodiment of the invention. For example, only some of the efficiency enhancing steps may be used in a particular compression system. Software as described herein is preferably provided on a computer readable media, such as a diskette or an optical disk. Alternatively or additionally, it may be stored on a computer, for example in a main memory or on a hard disk, both of which are also computer readable media It will be appreciated by a person skilled in the art that the present invention is not limited by what has thus far been described. Rather, the scope of the present invention is limited only by the following claims.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a server that provides remote client access to one or more computer programs, a method of determining when to generate a compressed video stream representing a display for the one or more computer program s by monitoring changes to the display, the method comprising:

executing a computer program at a server, wherein the execution of the computer program generates display objects from a set of display commands, the display objects are at least a portion of a display for said computer program;

identifying changes of said display which are responsive to at least one type of continuous user interaction command received from a remote client;

determining whether said changes warrant an update to an image based at least in part on one or more of available bandwidth, available computing power, or type of user connection; and upon determining said changes do warrant an update, processing said changes and converting said display commands into a compressed video stream, wherein said changes are inserted into said compressed video stream at an update frame rate corresponding to a priority assigned to other portions of the display that are unchanged and such that changes to said image are inserted into the compressed video stream at a faster rate than compressed data that does not include changes to said image.

2. A method according to claim 1, wherein said type of user command comprises a pointing device command.

3. A method according to claim 1, wherein said changes comprises an indication of a selection of a GUI (graphical user interface) element.

4. A method according to claim 1, comprising analyzing said user command to determine display commands which effect said identified changes.

5. A method as recited in claim 1, wherein the display commands are directly converted into the compressed video stream without first generating a display raster of the display commands.

6. The method of claim 1, wherein only changed portions of the image are processed and a new output frame is assembled that includes both newly compressed image portions and unchanged compressed image portions.

* * * * *